US011151012B2

(12) United States Patent
Sprague et al.

(10) Patent No.: US 11,151,012 B2
(45) Date of Patent: Oct. 19, 2021

(54) PREDICTIVE RESERVED INSTANCE FOR HYPERSCALER MANAGEMENT

(71) Applicant: NetApp, Inc., Sunnyvale, CA (US)

(72) Inventors: Jason Sprague, Westford, MA (US); Nir Nossenson, Winchester, MA (US); Sibel Kadioglu, Waltham, MA (US); Ravi Kesarwani, Lexington, MA (US); Omri Kessel, Waban, MA (US)

(73) Assignee: NETAPP, INC., San Jose, CA (US)

( * ) Notice: Subject to any disclaimer, the term of this patent is extended or adjusted under 35 U.S.C. 154(b) by 0 days.

(21) Appl. No.: 16/752,425

(22) Filed: Jan. 24, 2020

(65) Prior Publication Data

US 2021/0232479 A1    Jul. 29, 2021

(51) Int. Cl.
*G06F 11/34*   (2006.01)
*G06F 11/30*   (2006.01)
*G06N 5/04*    (2006.01)
*G06T 11/20*   (2006.01)

(52) U.S. Cl.
CPC ...... *G06F 11/3442* (2013.01); *G06F 11/3075* (2013.01); *G06F 11/3433* (2013.01); *G06N 5/04* (2013.01); *G06T 11/206* (2013.01)

(58) Field of Classification Search
CPC ............ G06F 11/3442; G06F 11/3075; G06F 11/3433; G06N 5/04; G06T 11/206
See application file for complete search history.

(56) References Cited

U.S. PATENT DOCUMENTS

| | | | | |
|---|---|---|---|---|
| 9,602,950 | B1* | 3/2017 | Gonzalez | H04W 4/50 |
| 9,774,489 | B1* | 9/2017 | Gupta | H04L 67/34 |
| 2011/0055385 | A1* | 3/2011 | Tung | H04L 43/16 |
| | | | | 709/224 |
| 2015/0019301 | A1* | 1/2015 | Jung | G06Q 10/06393 |
| | | | | 705/7.39 |
| 2018/0332138 | A1* | 11/2018 | Liu | H04L 41/5041 |
| 2019/0288922 | A1* | 9/2019 | Viklund | H04L 67/32 |
| 2020/0082316 | A1* | 3/2020 | Megahed | G06Q 10/06312 |
| 2020/0244733 | A1* | 7/2020 | Kinsey | G06F 21/6218 |

* cited by examiner

*Primary Examiner* — Jefferey F Harold
*Assistant Examiner* — Franklin S Andramuno
(74) *Attorney, Agent, or Firm* — Haynes and Boone, LLP

(57) ABSTRACT

An example system and method to provide a dashboard for users to analyze and review their hyper-scaler usage and spending and offer optimizations to predict optimal use of reserved and unreserved instances on various hyper-scaler platforms. While hyper-scaler platforms offer flexibility for users to scale their use on a platform, there is a potential risk of rapid cost overruns in large enterprise organizations that may be difficult to control and predict. In some examples, the system can determine an optimal number of reserved instances using past usage data and/or prediction data from a user may be used by the system to make forward predictions about reserving an optimal number of instances and minimizing hyper-scaler resource use.

20 Claims, 17 Drawing Sheets

PREDICTIVE RESERVED INSTANCE FOR HYPERSCALER MANAGEMENT

TECHNICAL FIELD

The present disclosure relates generally to computing system monitoring and, more particularly, to providing visual information about the state of computing systems and optimizing cloud computing resources.

BACKGROUND

Cloud platforms, also known as hyper-scaler platforms, allow an architecture to scale appropriately as increased demand is added to a system. Thus, users of hyper-scalers may efficiently scale their use from one server or a few servers to thousands of servers. Hyper-scaler platforms offer agility, flexibility, scalability, distributed architectures, that are easy to configure and use through software.

Use of hyper-scaler platforms includes a potential risk of rapid cost overruns in organizations that may be difficult to control and predict. A "reserved instance" virtual machine may be paid for up front, but the exact number of reserved instances to buy can be unknown or difficult to calculate. Reserving too many may waste customer resources, while reserving too few may cause the customer to miss an opportunity to minimize costs.

DETAILED DESCRIPTION

Figure 1:
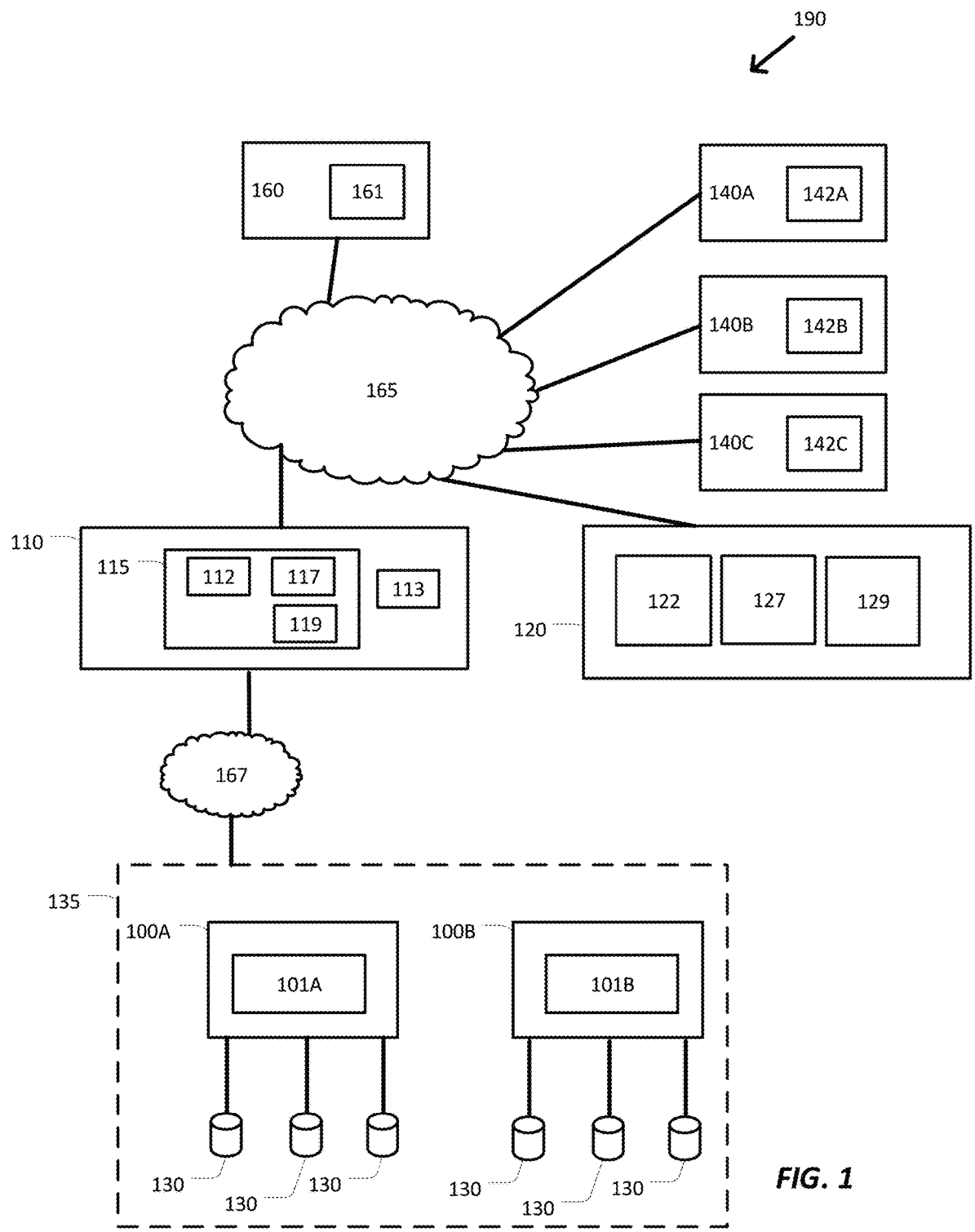
FIG. 1 is a simplified block diagram of an example computing system according to one embodiment.

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Overview

Various embodiments of the present disclosure provide a dashboard for users to analyze and review their hyper-scaler usage and spending and offer optimizations to predict optimal use of reserved and unreserved systems on various hyper-scaler platforms. While hyper-scaler platforms offer flexibility for users to scale their use on a platform, there is a potential risk of rapid cost overruns in large enterprise organizations that may be difficult to control and predict. Many hyper-scaler platforms offer the concept of a "reserved instance" virtual machine (e.g. EC2 on AWS). To use a reserved instance, users may pay up front to buy such reservations and use the pool to create instances that may be less expensive than unreserved instances. However, the exact number of reserved instances to buy can be unknown or difficult to calculate. If a user reserves (e.g., purchases) too many, the customer may be wasting money on the initial purchase. If the user reserves too few, the customer may have missed an opportunity to minimize costs.

According to embodiments of the present disclosure, a machine learning algorithm may predict and inform a user of a recommended reserved instance purchase that can minimize cost over the purchase time frame. This may be calculated based on past usage/spending and estimating how that will change moving forward. This may include use of a probabilistic algorithm which incorporates past usage but may also allow users to adjust the results based on business knowledge of future usage patterns. For example, a business owner may have knowledge that new product is coming online in a few months, and therefore the organization cloud usage might be expected to go up by a significant percentage. Therefore, a simpler deterministic prediction based solely on past usage up until 'now' may provide an inadequate result. The business owner may wish to be able to express the fact that the spend will go up and have that adjust the results of the prediction. According to some embodiments, the user interface is a (UI) widget system that may accept user input to express their future business needs (e.g., surges in capacity, or length planned shutdowns) to the system so that the business needs could be fed as parameters to the system.

The present disclosure describes a cost optimization algorithm that determines the optimal number of machines in a time period (e.g., a year, a month, or as appropriate) that should be reserved per instance type or family, in order to reduce or minimize the expected costs. In some hyper-scaler platforms (e.g., AWS), reserved instances cost less per hour compared to on-demand instance usage, but once a reservation is made the billing persists for one year regardless of the actual usage. On the other hand, on-demand instances cost more per hour but only the actual usage is charged. A reservation of $N_{res}$ machines from a certain type means that $N_{res}$ machines will be billed every hour of the year, and if the number of machines in a certain hour rises about the number of reservation, the difference $N_{usage}-N_{res}$ is charged according to on-demand prices, $C_d$, which are higher than the cost per reserved machine $C_{res}$. Thus, if a user reserves too much or too little, that user might overpay. The question is what is the optimal number of reservations to minimize the cost? The general challenge is that the actual usage pattern changes and fluctuates over time. The reservation, to be optimal, may take into account future usage that might go up and down and may include some element of uncertainty.

The present disclosure describes multiple algorithms. A first example algorithm assumes that next year's usage pattern will be identical to the usage pattern in a reference period. This is referred to as the deterministic algorithm. A second example algorithm uses the ability of users (e.g. managers and engineers) to plan for future usage up to some uncertainty. This is referred to as the probabilistic algorithm. Both the plan and the plan's uncertainty may be provided by the user.

A dashboard interface may be provided to users to track their hyper-scaler platform usage across a plurality of platforms. Different pages of the dashboard may display data about different hyper-scaler platforms. Another page may display data about aggregate usage and statistics. The dashboard may receive current pricing and usage data from hyper-scaler platform API(s) or via user input of a statement from the platform. Instance pricing may be based on, e.g., an instance type (e.g., a family and a size), a geographic region, a tenancy (shared or single-tenant/dedicated hardware), and a platform (operating system) as well as whether it is an on-demand or reserved (based on a particular term), and payment options (upfront payment, partial upfront payments, and post-use payments, and whether reserved instances can be converted or exchanged for other types of instance with different instances or it is non-modifiable. The dashboard may visualize the pricing and usage information using charts and graphs and may provide statistics to the user about the usage of the hyper-scaler platform. An input interface may allow a user to input expected future usage. The future usage input by the user may be based on historical usage shown in a historical use graph and copied by the user. For example, if the user had a similar product launch, the usage data from that event may be used and further modified by the specific expectations of the user. In one embodiment, the user enters the future usage input as parameters of the probabilistic algorithm, and the algorithm determines a more accurate prediction for an optimal number and cost of reservations for the coming time period (e.g., week, month, quarter, year, two years, three years, five years, ten years).

The dashboard interface provides an interface where data from a variety of sources a distributed architecture (e.g. multiple hyper-scaler platforms, other network storage) in a distributed fashion may be analyzed and enhanced to improve system and resource efficiency of the use of these platforms. Further, the improved user interface allows to accept input from a user to use and supplement downloaded usage data. Additionally, the present system is able to take virtual machine instance usage data (real-time or delayed/logged) and visualize that data on the dashboard interface that accepts user input to make recommendations about future usage. In some examples, the system may alter hyper-scaler platform instance reservations without user input (or only based on expected future use as described herein). Enhancing the usage data obtained from the hyper-scaler platforms with planning data from a user allows for predictions that are more accurate to more efficiently use the virtual machine instances of the hyper-scaler platforms resulting in improved computational performance and by allowing resources to more effectively be used and allows for improved load balancing within and between hyper-scaler platforms.

Example System Architectures

The example of FIG. 1 below is directed to a network storage system, and the scope of embodiments is applicable to a wide variety of computer systems other than storage systems. Accordingly, the concepts described herein for monitoring and providing contextual information may be applied to computing systems generally.

FIG. 1 is an illustration of a network storage system 190 adapted according to one embodiment. Various embodiments of the present disclosure may be implemented by the network storage system 190, as described in more detail below.

The system 190 includes server system 110 and 120 connected to client system 160 and one or more hyper-scaler platforms 140 via a network 165. In some embodiments, system 190 includes server system 110 or 120 while in other embodiments system 190 includes both server system 110 and server system 120. Server system 110 may be used when connecting to and retrieving information from a non-hyper-scaler platform and hyper-scaler platforms, running applications in virtual machine 115. Server system 120 may be used when connecting to and retrieving information from hyper-scaler platforms, running applications outside of a virtual machine. Hyper-scaler platforms 140 include storage and processing subsystems 142 and may execute one or more virtual machines. Hyper-scaler platform 140 may be connected to client system 160 and service systems 110 and/or 120 via a REST-based API.

The server system 110 accesses storage subsystems 100 that are connected to the server system 110 via a network 167. The storage subsystems 100 are included in a cluster 135. Each storage system 100 in the cluster 135 includes a set of storage devices 130 for storing client data, the storage devices 130 of the cluster 135 providing the shared storage of the storage system 100. Each storage subsystem 100 also includes a storage controller 101. Each storage controller 101 exercises low-level control over physical storage devices 130 to provide virtualized storage to server system 110 and client 160. Examples of storage hardware that can be used as physical storage devices 130 includes, e.g., hard disk drives and solid state drives, though the scope of embodiments is not limited to any particular storage hardware.

Each storage device 130 may store data from logical storage entities such as one or more storage volumes, where each volume has a file system implemented on the volume. A file system implemented on the logical storage entity may provide multiple directories in a single volume, each directory containing various filenames each of which may be mapped to a multitude of storage devices 130.

Client system 160 may run one or more applications (e.g., word processing or database programs, typified by application 161) that use the storage system. Client system 160 includes a computer system that interacts with server system 110 for submitting read/write access requests and for receiving or transmitting data from or to the server system 110 over the network 165. In a virtual server environment, application 161 on client system 160 may interact over the network 165 with one or more virtual machines (VMs) 115 executing on server system 110.

Various embodiments may include a system monitoring tool that receives data from the system assets, monitors performance of the system assets, and provides user access to analyzed system data. System 190 includes a system monitoring tool that is implemented as an application. For instance, a system monitoring tool can be implemented as application 161 at client 160. Additionally or alternatively, the system monitoring tool may be implemented as one of applications 112, 117, 119 of server system 110 or applications 122, 127, and 129 of server system 120. For ease of description, applications 117 and 127 are described as system monitoring tools, though it is understood that applications 112, 122, 119, and/or 129 may be used as system monitoring tools alone or in combination with other applications. The system monitoring tool 117 and/or 127 may receive system data by communicating with storage operating systems at each storage controller 101 and/or hyper-scaler platforms 140. For instance, system monitoring tools 117 and 127 may communicate via one or more application programming interfaces (APIs) to receive system information, such as hardware names, volume names, usage data, storage capacity, read and write operations per second, and the like. Various types of system information are described in more detail below. In short, the system information of this example includes any type of information that allows the monitoring tools 117 and 127 to construct a comprehensive description of the architecture, state, and performance of system 190 and optimize reserved instance allocation on hyper-scaler platforms 140.

System 190 also includes a dashboard manager that provides contextual information of the system to a human user in an easily understandable format. Dashboard manager 119 and 129 may be implemented as an application. For the purposes of this example, application 119 and 129 are described as the dashboard manager 119 and 129. The dashboard manager 119 and 129 receives system data by retrieving the data collected by the system monitoring tool 117 and 127. In an example, system monitoring tool 117 and 127 collects the data and stores the data in a data warehouse (not shown, but may be implemented in any of systems 110, 120, 140). Dashboard manager 119 and 129 may communicate with the data warehouse via one or more application programming interfaces (APIs) to receive system information, such as hardware names, volume names, usage data, storage capacity, read and write operations per second, and the like. Although system monitoring tool 117 and 127 and dashboard manager 119 and 129 are illustrated as being separate applications, in other embodiments, system monitoring tool 117 and 127 and dashboard manager 119 and 129 may be combined together (117 and 119; 119 and 129) into one application.

Server systems 110 and 120 includes a computer system that executes applications and interacts with the client system 160 for receiving read/write access requests and receiving or transmitting data from or to the client system 160 over the network 165. Server systems 110 and 120 in this example is connected to the client system 160 over a network 165 such as a local area network (LAN), an Ethernet subnet, a peripheral component interconnect (PCI) or PCI express (PCIe) subnet, a switched PCIe subnet, a wide area network (WAN), a metropolitan area network (MAN), the Internet, or the like.

The server system 110 or 120 may include any appropriate computer hardware and software. In one example, server system 110 or 120 includes a general-purpose computer configured to execute any of a variety of operating systems, including the Unix™, Linux™, and Microsoft Windows™ operating systems.

Server system 110 includes hypervisor 113, which creates and manages one or more Virtual Machines (VMs)—in this case, VM 115. The present example shows only a single VM 115, though in other embodiments, the server 110 includes multiple VMs (not shown), each VM being used by and connected with a client 160 through computer network 165. Thus, systems with more than one client 160 may include more than one VM 115, each client being supported by at least one VM. VM 115 includes an encapsulation or instance of an operating system and applications 112, 117, and 119 executing on top of that instance. Briefly, application 112 provides read/write access to the clients 160 to data stored in cluster 135. Application 117 is a system monitoring tool described in more detail below. In some embodiments, different types of VM hypervisors 113 may be used (e.g., VMware™ ESX, Microsoft™ Hyper-V, etc.). Application 119 provides contextual information of one or more storage resources for a user. Server system 120 illustrates an embodiment that does not use virtual machines.

Each storage system 100 is configured to allow server system 110 to access its data, for example, to read or write data to the storage system. The server system 110 executes application 112 that "connects" to storage systems 100 over computer network 167 to send an access request (read or write request) to storage system 100 for accessing particular data stored on the storage system 100. The VM application 112 executing on the server 110 services the connected client 160 by receiving the client access requests and submitting the access requests to the storage system 100 for execution.

The scope of embodiments is not limited to the particular architecture of system 190. For instance, other systems may include additional servers, each server being similar to server system 110. While the example of FIG. 1 shows only one client 160, it is understood that any appropriate number of clients may be supported by the system 190. Moreover, while cluster 135 shows two storage subsystems 100*a* and 100*b*, it is understood that any appropriate number of controllers and storage drive arrays may be used with various embodiments. For instance, some embodiments may include only a single storage subsystem, whereas other embodiments may include three or more storage subsystems. In other words, the scope of embodiments is not limited to a single storage cluster.

System monitoring tool 117 and 127 monitors the assets of system 190, where the assets include any hardware or software component that is included in the architecture of system 190 or affects the performance of the system 190. Examples of assets include the underlying storage drives (e.g., HDDs and SSDs), virtual volumes, storage controllers, storage subsystems, aggregates of storage subsystems, network connections, virtual machines, hypervisors, applications, and the like.

Figure 2:
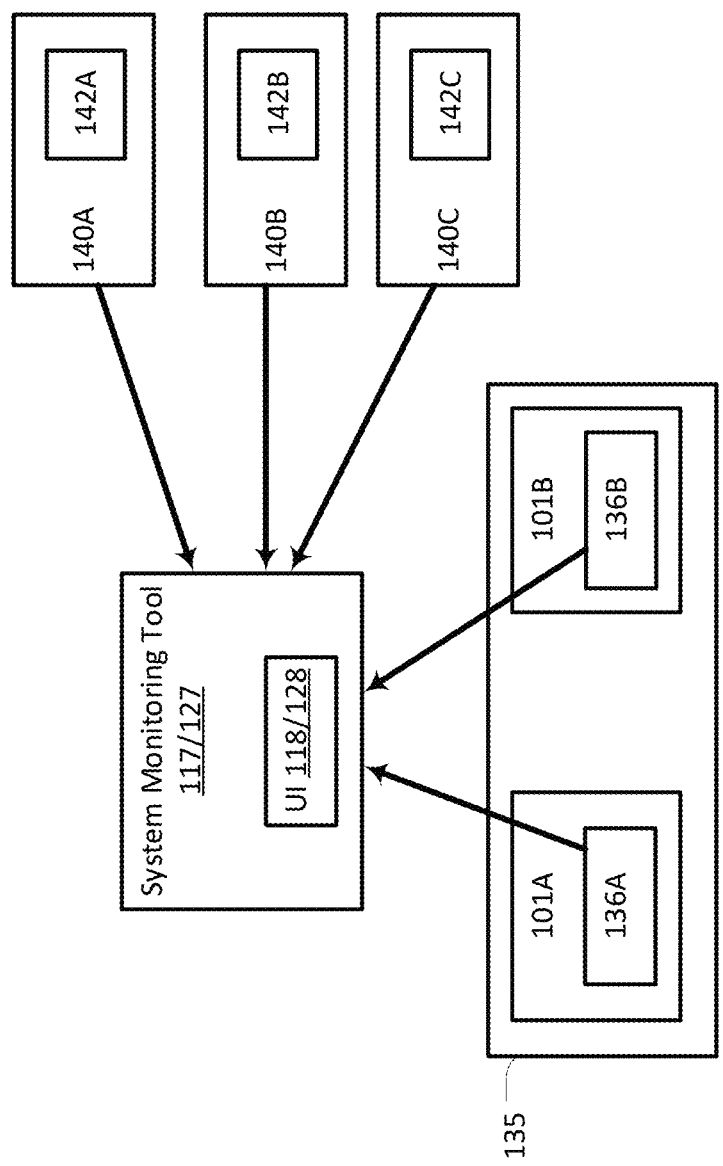
FIG. 2 is a simplified block diagram of an example relationship among applications a server, and hyper-scaler platforms according to one embodiment.

FIG. 2 is a block diagram illustration of an exemplary conceptual layout according to one embodiment. Application 117 and 127 are system monitoring applications that provide for data collection, analysis, and display for performance aspects and contextual information of system 190. As explained above with respect to FIG. 1, tool 117 and 127 may be run in a VM in a storage server; additionally or alternatively, a performance management tool may be embodied as an application run on a client (not shown), a hyper-scaler platform 140, or on any appropriate computer.

Figure 3:
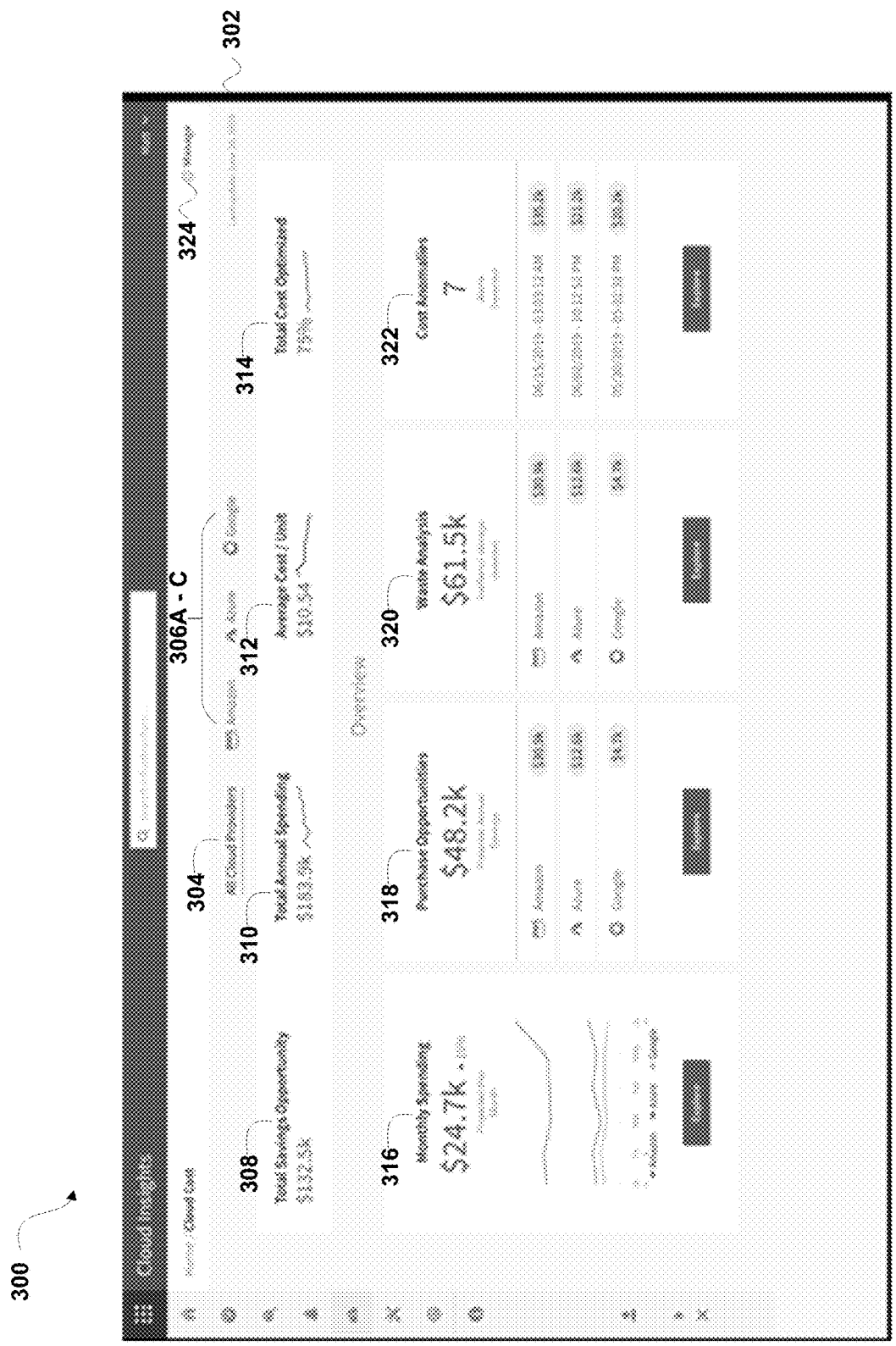
FIG. 3 is a simplified diagram of an example display of contextual information of a computing system according to one embodiment.

A human user interacts with system monitoring tool 117 and 127 via UI 118 and 128. UI 118 and 128 may include a command line interface, a graphical user interface (GUI), or another appropriate interface. The human user may rely on UI 118 and 128 for troubleshooting and viewing performance data. For instance, the human user may input information identifying requested contextual information, performance statistics, identify new assets, and change settings using UI 118 and 128. FIG. 3 describes an example screen that may be displayed by UI 118 and 128.

Storage operating systems (OSs) 136 run on storage controllers 100 (FIG. 1). The scope of embodiments may include any appropriate OS that provides low-level control to implement virtual storage on storage drives. Storage OS instances 136 run on one or more processors at storage controllers 100. Also, communication between storage OSs 136 and system monitoring tool 117 go through communication links, such as network 167 (FIG. 1).

System monitoring tool 117 and 127 may automatically import information on the various infrastructure assets in system 190, providing accurate and real-time visibility of servers, virtual servers, Host Bus Adaptors (HBAs), switches, storage arrays, and the like as well as usage records and cost data for hyper-scaler platforms 140. In one example, system monitoring tool 117 and 127 discovers the assets by polling each of the assets that it is aware of. Each of the deployed assets provides one or more APIs that can be used to request information therefrom. System monitoring tool 117 and 127 is programmed to use those APIs to automatically import the information. Imported information can include, but is not limited to, storage capacity, data usage, device type, latency, operations per second, faults, and the like. The scope of embodiments is not limited to any particular asset information, and any appropriate asset information may be imported in various embodiments.

Example Dashboards

FIG. 3 is an example display 300 of system contextual information according to one embodiment. FIG. 3 may be presented by UI 118 and 128 (FIG. 2) on a display screen of a computing device to a human user. The underlying data analysis is performed by system monitoring tool 117 and 127 and dashboard manager 119 and 129 (FIG. 1). FIG. 3 shows a graphical display in which contextual information for multiple, different assets is displayed, thereby providing the human user with intuitive, digestible information. Dashboard manager 119 and 129 provides contextual information of the environment to a user via dashboard 302.

Display 300 illustrates a dashboard 302, which in this example is provided in a single screen of information providing contextual information for the management of hyper-scaler services. Hyperlinks 304 and 306 are displayed to access pages about all cloud providers 304 and each individual hyper-scaler platform 306, for example, AMAZON AWS, MICROSOFT AZURE, and GOOGLE CLOUD. Dashboard 302 displays information tabulated using data scraped from hyper-scaler platforms via API calls and/or statements from hyper-scaler providers. This information includes total savings opportunity 308 (e.g., an estimated amount of overspend), total annual spending 310, which describes the total amount spent on cloud services across all hyper-scaler platforms, average cost/unit 312, and total cost optimized (estimated savings as a percent of current spending) 314. Dashboard 302 may also display graphs illustrating monthly hyper-scaler spending 316 as well as total amount projected to be spent in the current month. Graph 316 may include information including a breakdown between various hyper-scaler platforms and indicate changes from previous months. Purchase opportunities module 318 may be displayed on dashboard 302, which lists predicted potential annual savings (a total figure) and a breakdown for each hyper-scaler platform. Waste analysis module 320 includes a total amount of inefficient storage detected as well as a breakdown of costs of inefficient storage at each hyper-scaler platform. Cost anomaly module 322 includes a total amount of cost anomalies detected as well as a breakdown of cost anomalies at each hyper-scaler platform. Modules 316-322 may include hyperlinks to pages for a user to explore the presented information of the module in depth.

Dashboard 302 may also include a hyperlink 324 to manage the dashboard including moving data or modules around the page to highlight different information according to user preferences.

Figure 4:
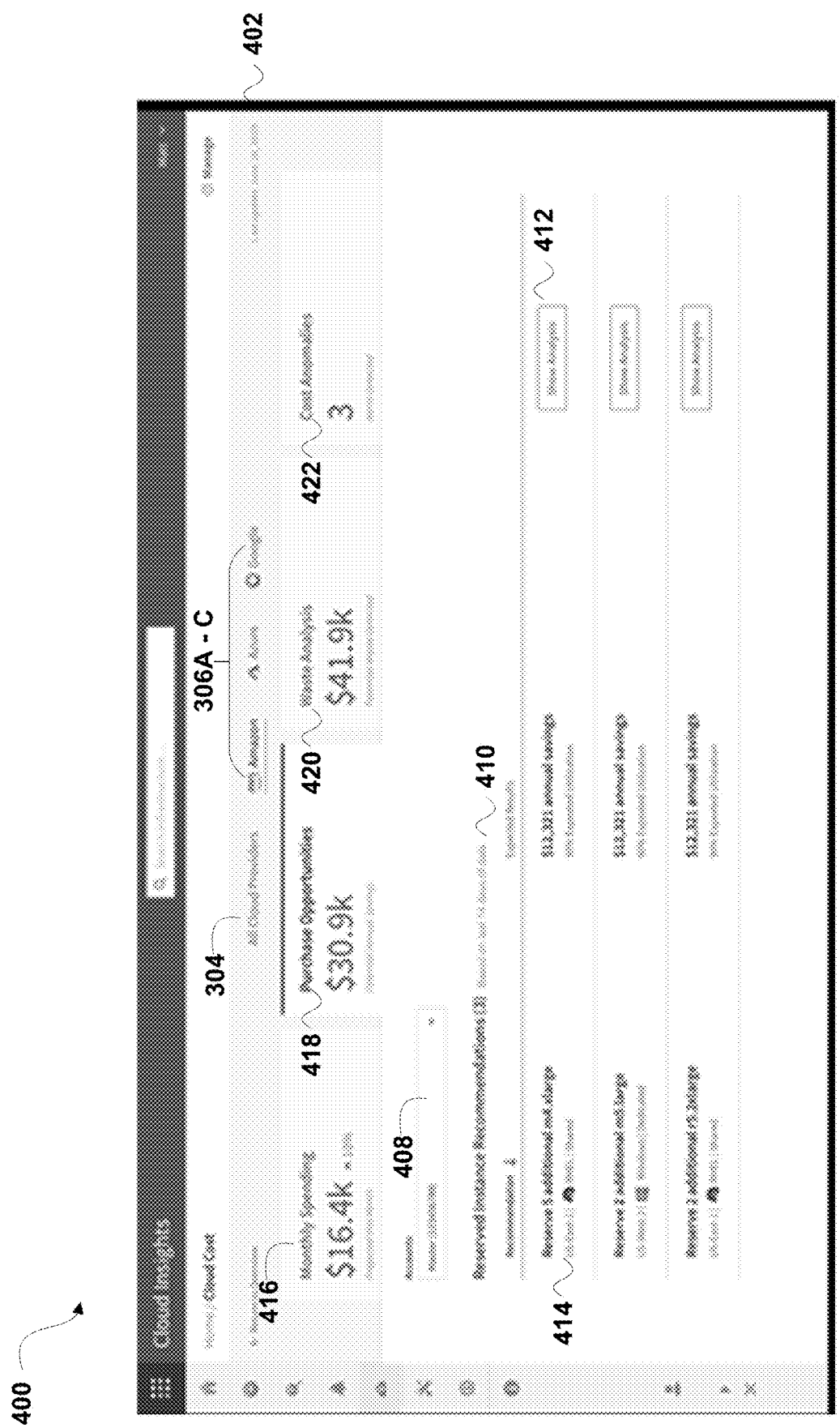
FIG. 4 is a simplified diagram of an example display of contextual information of a computing system according to one embodiment.

FIG. 4 is an example display 400 of system contextual information for a particular hyper-scaler platform according to one embodiment. FIG. 4 may be presented by UI 118 and 128 (FIG. 2) on a display screen of a computing device to a human user. The underlying data analysis is performed by system monitoring tool 117 and 127 and dashboard manager 119 and 129 (FIG. 1). FIG. 4 shows a graphical display in which contextual information for a single hyper-scaler platform is displayed, thereby providing the human user with intuitive, digestible information. Dashboard manager 119 and 129 provides contextual information of the environment to a user via dashboard 402.

Display 400 illustrates a dashboard 402, which in this example is provided in a single screen of information providing contextual information for the management of hyper-scaler services. Hyperlinks 304 and 306 are displayed to access pages about all cloud providers 304 and each individual hyper-scaler platform 306, for example, AMAZON AWS, MICROSOFT AZURE, and GOOGLE CLOUD.

Dashboard 402 may display graphs illustrating monthly hyper-scaler spending for the particular hyper-scaler 416 as well as total amount projected to be spent in the current month. Purchase opportunities module 418 may be displayed on dashboard 402, which lists predicted potential annual savings (a total figure). Waste analysis module 420 includes a total amount of inefficient storage detected for a particular hyper-scaler platform. Cost anomaly module 422 includes a total number of cost anomalies detected at a particular hyper-scaler platform. Each module 416-422 may be a table on the dashboard 402 which can display more information when clicked by a user. Dashboard 402 illustrates more information about the purchase opportunities module 418. A pulldown may include each of the accounts a user has with the particular hyper-scaler platform. A list of recommendations 410 may include one or more recommendations 414 such as reserving a number of additional machines or types of machines. The types may be delineated by location, operating system, whether it is a dedicated or shared machine, and the hardware included in the machine. These types may be standardized or specific to a particular hyper-scaler platform. An expected utilization of reserved machine resources may be presented for each recommendation. Expected savings results may be presented as well as a button 412 to show a more in-depth analysis for each of the listed recommendations.

Figure 5:
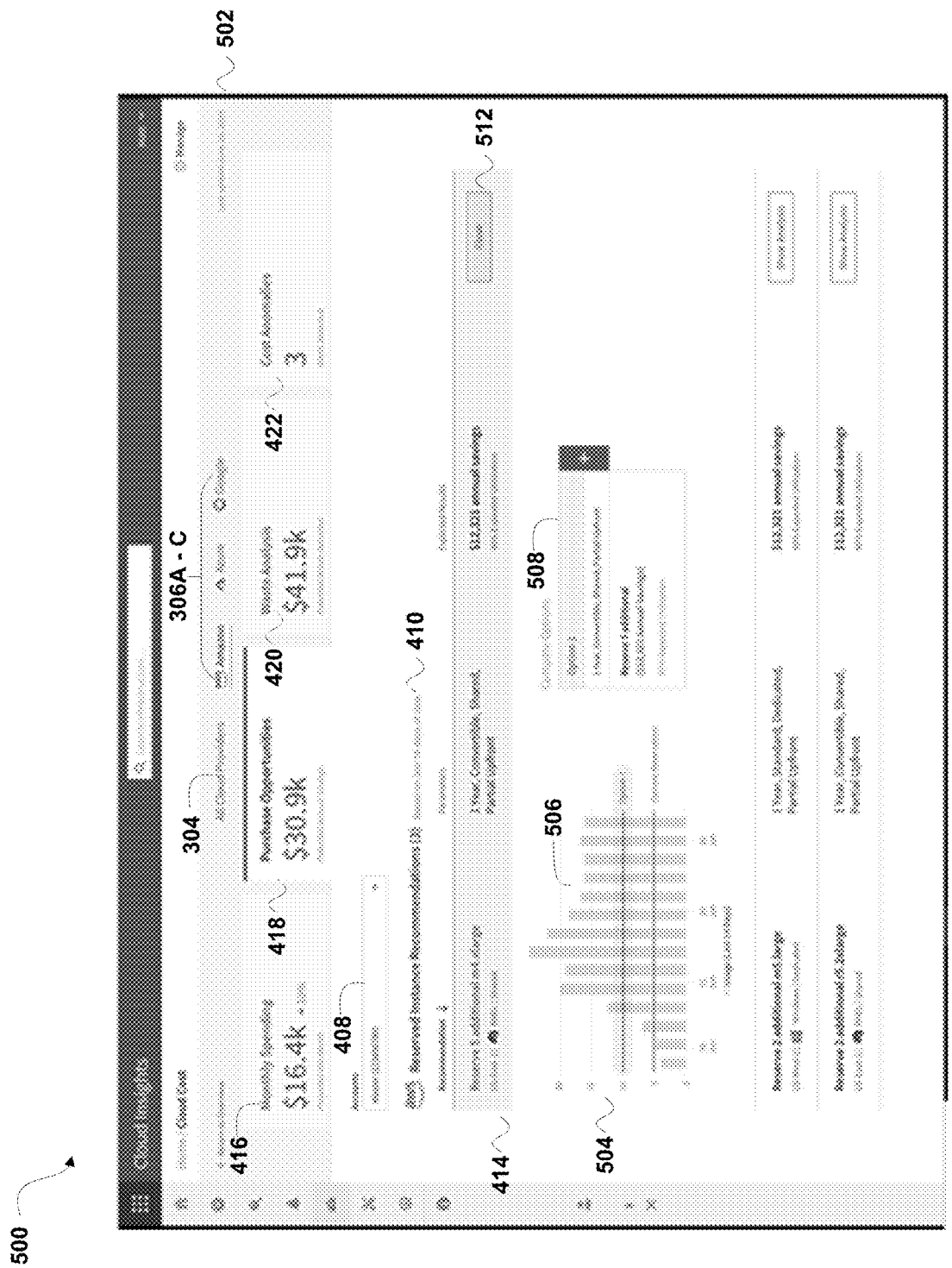
FIG. 5 is a simplified diagram of an example display of contextual information of a computing system according to one embodiment.

FIG. 5 is an example display 500 of system contextual information for a particular hyper-scaler platform according to one embodiment. FIG. 5 may be presented by UI 118 and 128 (FIG. 2) on a display screen of a computing device to a human user. The underlying data analysis is performed by system monitoring tool 117 and 127 and dashboard manager 119 and 129 (FIG. 1). FIG. 5 shows a graphical display in which contextual information for a single hyper-scaler platform is displayed, thereby providing the human user with intuitive, digestible information. Dashboard manager 119 and 129 provides contextual information of the environment to a user via dashboard 502.

Dashboard 502 illustrates an exemplary view when hyperlink 412 is clicked (FIG. 4) to "show analysis" about recommendation 414. Information box 504 is expanded showing additional details about the recommendation 414 including graph 506. Graph 506 illustrates usage in the last thirty days (but could be any length of time including the last week, month, quarter year, half year, year, two years, three years, etc.) and how many machines are currently reserved and how many would be reserved if the recommendation is taken. In some examples, multiple options are provided in box 508, each of which may be illustrated on graph 506. Button 512, when clicked on by a user, may close the information box 504 and return the view to dashboard 502 to the view illustrated in dashboard 402 (of FIG. 4).

Figure 6:
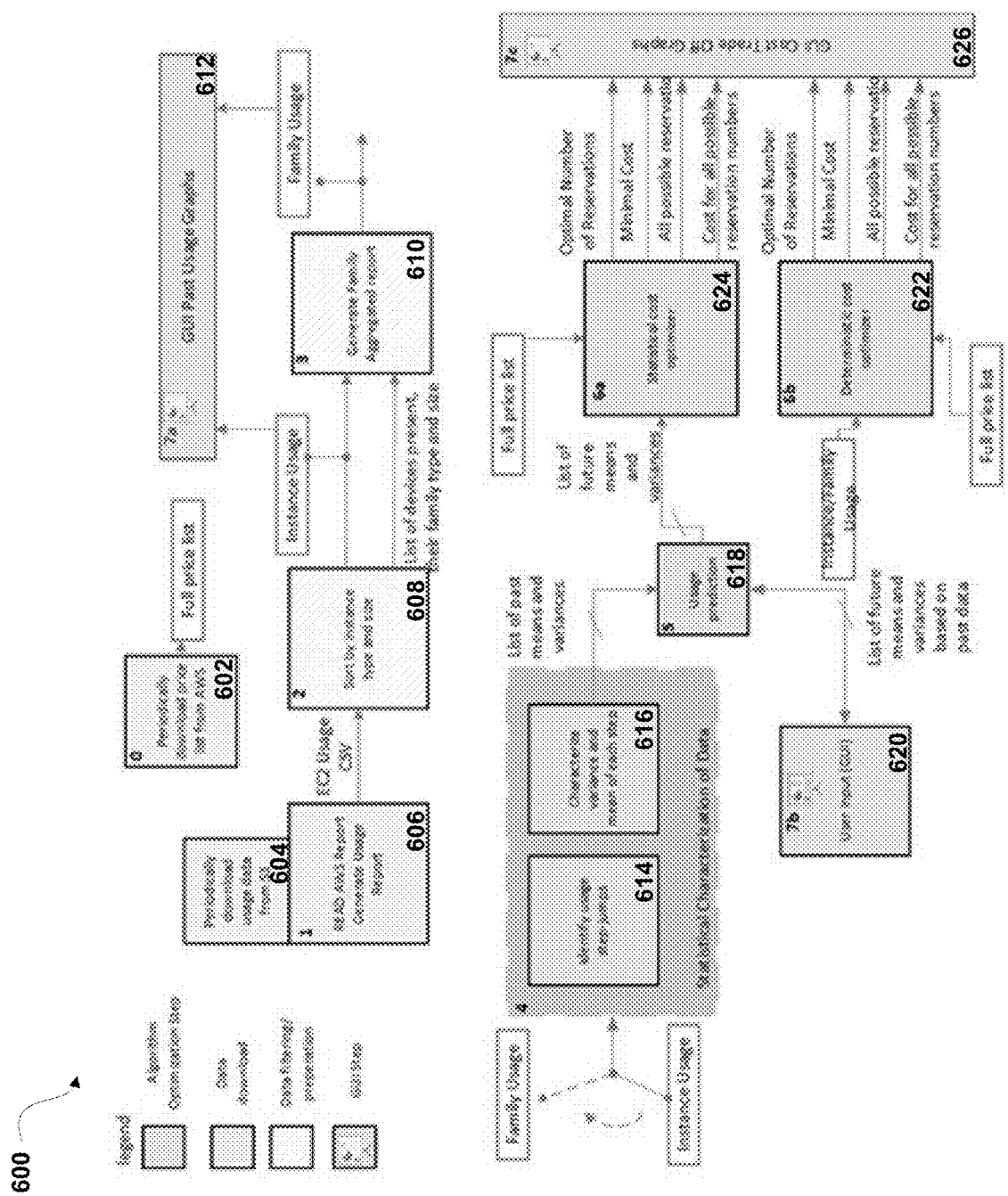
FIG. 6 is a simplified diagram of an example method of determining an optimal number of hyper-scaler reserved machines according to one or more embodiment.

FIG. 6 is a flowchart illustrating an exemplary method 600 of determining the recommendations for optimizing usage of a hyper-scaler platform. The recommendations may be presented via a dashboard as illustrated in FIGS. 3-5. Server systems 110 and 120, client system 160, and a hyper-scaler platform 140 may perform method 600 (and include the described modules), however for simplicity, the steps are described as being performed by server system 110.

Server system 110 may include a price list fetcher module. The price list fetcher module may download an updated price list from a hyper-scaler platform (e.g., AWS), at block 602. In some embodiments, the price list is downloaded periodically, e.g., on a daily/weekly/monthly basis.

Server system 110 may include a hyper-scaler platform usage downloader module. The hyper-scaler platform usage downloader module may be configured to download a price list from the hyper-scaler platform, at block 602. The hyper-scaler platform usage downloader module may download prices from the hyper-scaler platform on a daily/weekly/monthly/annual basis. Server system 110 may download usage data on behalf of a user from the hyper-scaler platform, at block 604. In some examples, a user may upload the usage data to server system 110. The usage data may be found in usage logs or billing reports and may have been generated by the hyper-scaler platform or by client system 160. In other examples, server system 110 may record hyper-scaler platform usage in an internal log rather than retrieving a full log from the hyper-scaler platform. Data may be gathered from hyper-scaler platforms via an API.

Server system 110 may read the downloaded usage data and generate a usage report, at step 606. In some exemplary billing reports, conversion of the billing report to a machine hourly usage may be based on the style conventions of the billing report. One challenge may be that the same machine in the same time frame could appear more than one time in the usage report: once as an on-demand charge and another as a reduced rate (reserved) charge. Moreover, the on-demand charge is not specified for its exact period, but rather as the total number of hours charged inside a larger time frame in which the specific machine was on. For example, a machine with resource id 'i-0ff4c98be671615b6' could be on from 14:00-23:00 but charged only 5 hours on demand. Thus, an additional report line may cover the extra 4 hours that were done with a reduced cost.

To address this reporting method the following translation method from billing to usage may be employed by server system 110: (1) For each day identify the unique machines that were active. Each such machine may have a unique 'lineItem/ResourceId' associated with it. (2) In each hour of the day, the same machine 'lineItem/ResourceId' could be either active or inactive. Thus, server system 110 may keep an activity array of length 24 (hours) for each machine ResourceId along the day. The machine id is active at a particular hour if one or more billing report lines include that hour inside within the range {'lineItem/UsageStartDate' 'lineItem/UsageEndDate'}. If two report lines of the same machine ResourceId include the same hour, the activity is still considered as one, since the specific machine is just a single machine and the duplicated activity of the same machine refers to the pricing not to the actual activity. (3) For each hour of the day, server system 110 may sum the number of active 'lineItem/ResourceId' that belong to the same machine type. For example, server system 110 may sum the number of active machines that are from type 'USE2-t3.2×large-RHEL'. Note that the number of active machines from the same type in the same hour could be larger than one, whereas the number of active machines per hour with the same machine 'ResourceId' cannot exceed one.

Figure 7:
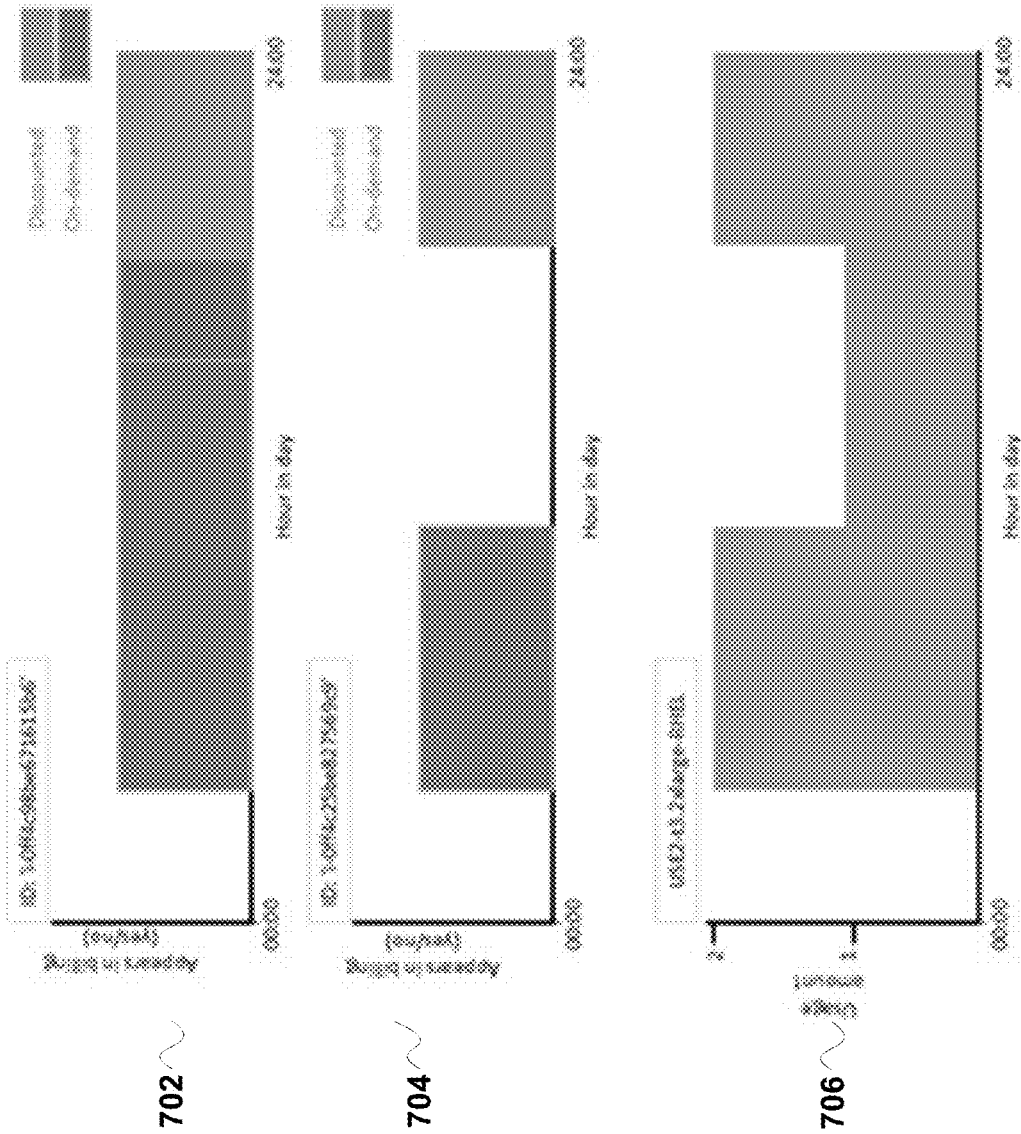
FIG. 7 illustrates an exemplary translation from a billing report to a machine usage type according to the present embodiments.

FIG. 7 illustrates an exemplary translation from a billing report to a machine usage type according to the present embodiments. As shown in FIG. 7, two or more different report lines may refer to the same 'lineItem/ResourceId', one line may refer to on-demand and another to a discounted (reserved) usage (illustrated as the curves in graphs 702 and 704). The activity of each 'lineItem/ResourceId' per hour may be tracked, and duplicated hours are counted as a single hour per a single 'lineItem/ResourceId'. Machines from the same type but with different 'lineItem/ResourceId' are added up, and the result represents the usage amount per type (illustrated in graph 706).

Turning back to FIG. 6, server system 110 may include an instance and family sorter module configured to sort the usage report according to device family type, and device size, at block 608. The usage report may be in a CSV (comma-separated values) file or some other formatting for processing by server system 110.

Server system 110 may include a family usage aggregator configured to combine usage reports of devices from the same family into a single aggregated usage report, at step 610. The aggregation of different device from the same family may be a linear weighted summation based on weights published by the hyper-scaler platform (e.g., Amazon).

At step 612, past usage data including instance usage data and family usage data may be visualized in one or more past usage charts and/or graphs. The information may be displayed to a user in a dashboard GUI.

Figure 8:
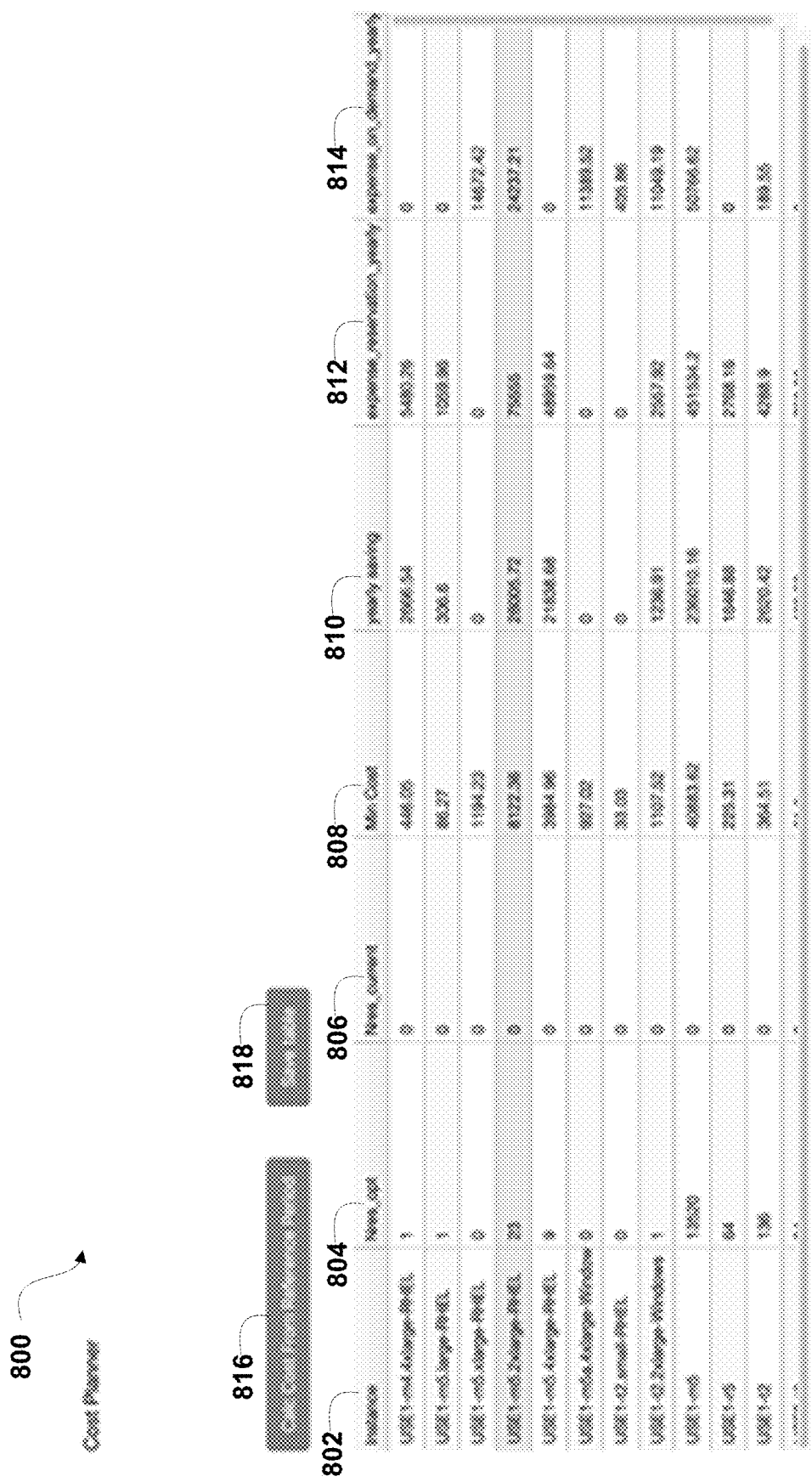
FIG. 8 illustrates an exemplary past usage chart according to the present embodiments.

FIG. 8 illustrates an exemplary past usage chart 800 according to the present embodiments. Rows on the past usage chart 800 represent different machine instances. Columns include instance identifier 802 which identifies the type of instance and/or machine identifier, $N_{res\_opt}$ 804 is the number of how many reserved instances are currently made, $N_{res\_current}$ 806 is the number of instances currently used, min cost 808, yearly savings 810, expense_reservation_yearly 812, and expense_on_demand_yearly 814. Button 816 allows a user to calculate the cost from a particular reference period. Button 818 allows a user to save table 800 locally (e.g., on client system 160) or on server system 110.

Figure 9:
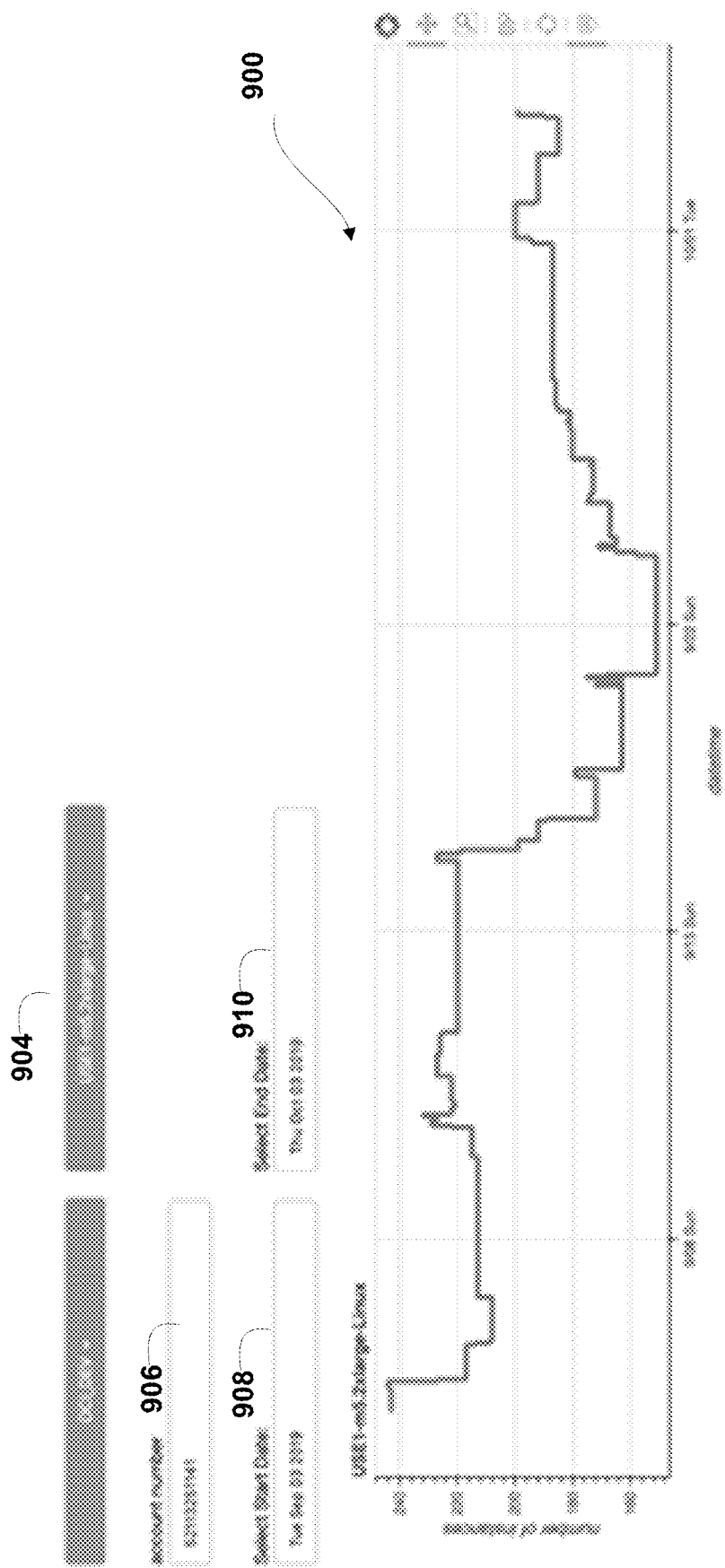
FIG. 9 illustrates an exemplary past usage graph and user interface according to the present embodiments.

FIG. 9 illustrates an exemplary past usage graph 900 and user interface according to the present embodiments. A user may select a particular instance or family type from pull-down 904 to display on graph 900. Particular account numbers 906, a start date 908, and an end date 910 may be selected to modify/filter the data used to generate graph 900. Graph 900 is a graph of the number of instances over a particular time period.

Turning back to FIG. 6, server system 110 may include a usage statistical characterizer configured to identify step jumps in usage, at step 614, and characterizes their mean and variance, at step 616. Identifying step jumps in the usage report or usage graph may be identified using a machine learning or artificial intelligence to identify particular usage pattern periods. The machine learning module may train on portions of actual usage data and predict the next portion of the usage data and compare it to the actual usage data to improve the prediction ability. A list is generated by server system 110 including the start times and durations of periods with a distinct mean and variance, the mean number of instances during each period, and the variance of the usage during each period. The use of the machine learning and/or artificial intelligence to identify the usage patterns improves the operation of server system 110 by allowing server system 110 to more efficiently make a prediction and use system resources.

Figure 6A:
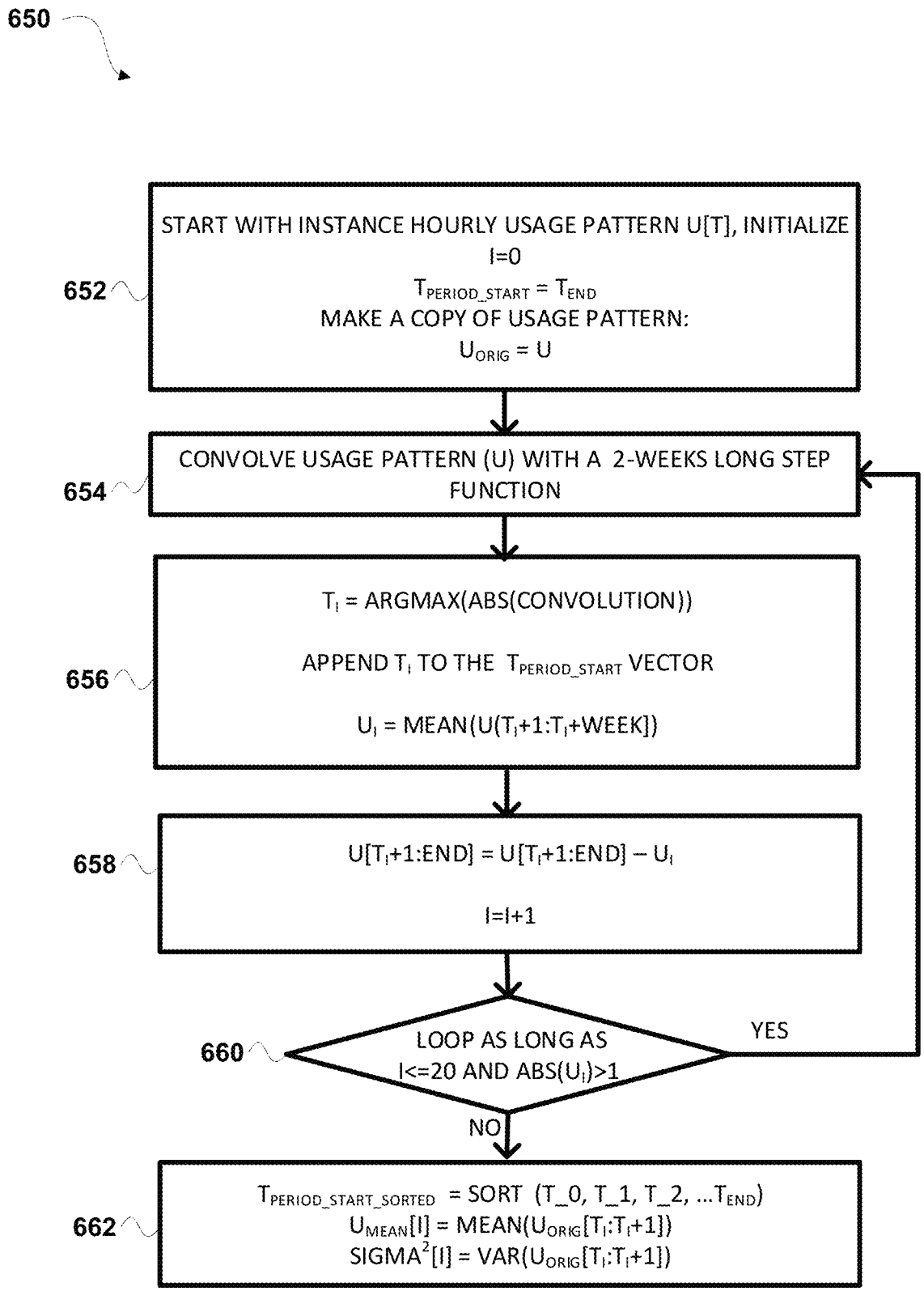
FIG. 6A is a flowchart further illustrating portions of FIG. 6.

FIG. 6A is a flowchart illustrating a more detailed explanation of steps 614 and 616 of FIG. 6. The flowchart describes the algorithm 650 by which a given reference usage pattern from past year(s) (or any time period) and with hourly (or some other time period) resolution, UN, is reduced to a shorter list of usage pattern change events, where the period between two consecutive change events is characterized in terms of the following parameters:

(a) The usage period start and stop times ($T_i$ and $T_{i+1}$, respectively);

(b) Mean number of instances inside the period $\mu_i$; and (c) The variance in the number of instances inside the $i^{th}$ period, $\sigma_i^2$.

The server system 110 using the present algorithm 650 receives the usage pattern U[t], given as the number of simultaneously active equivalent instances per hour (or other time period that may include a second, minute, hour, quarter day, half day, day, week), at step 652. Server system 110 may initialize counter i to 0 which describes the iteration number, and initialize the vector $T_{period\_start}$ to $T_{end}$, the end time of the data set (i.e., the largest value oft in U[t]). A copy of U may be copied as $U_{orig}$ so U may be manipulated.

Server system 110 may initiate the search for a change event in usage pattern by convolving a copy of the usage pattern (U) with a two-week step function whose post step-duration is one week in hourly resolution (or some other time period(s) for duration and resolution), creating a vector Convolution, at step 654.

At step 656, a time index with the maximum usage value for a usage period is determined by system 110. This may be determined by determining $T_i$. The maximum (absolute) value (using the argmax and absolute value formulas) of the Convolution vector is determined and set to value $T_i$. $T_i$ is then appended to vector $T_{period\_start}$ to add the period as an end point for another characteristic period. The tentative mean of the period $U_i$ is the mean usage over a week starting from that point which is determined by taking the mean of the usage pattern of the next period ($T_{i+1}$) until a week later ($T_{i+WEEK}$), using the formula $U_i$=MEAN(U[$T_i$+1:$T_{i+WEEK}$]). WEEK may be the number of hours in a week, 168. Different time lengths may be used to determine a tentative mean.

At step 658, the copy of the usage pattern from that point on is subtracted by the calculated tentative mean usage (the tentative value will be refined later, at step 662), using formula, U[$T_i$+1:END]=U[$T_i$+1:END]−$U_i$, by server system 110. Counter i is then incremented using formula i=i+1.

The process of finding another usage jump time point is then repeated by using the same steps 654-658 again (convolution, argmax, tentative mean usage calculation, and subtraction of the tentative mean from the copied usage pattern), step 660 "yes" branch. This iteration process continues until the copied usage pattern flattens out to an extent that only residual steps if any are left out. This happens due to the repeated mean subtractions. At the end of the process, at step 660 "no" branch, we are left with up to 20 periods (or some other threshold value) of characteristic usage per year (i.e., when i is greater than or equal to 20) or when the absolute value of U, is less than or equal to 1.

At step 662, these periods are sorted according to chronological order (using formula $T_{PERIOD\_START\_SORTED}$=SORT($T\_0, T\_1, T\_2, \ldots T_{END}$), and the mean ($U_{mean}$[i]) and variance ($\sigma_i^2$ or SIGMA$^2$[i]) in each period is calculated using the original usage pattern $U_{ORIG}$ (not using the copy which was used for the subtractions). Note that up to twenty characteristic periods (or the above identified threshold number of periods) are identified, is substantially fewer than the original 8760 periods (each hour in the year-long) usage pattern.

At step 618, server system 110 may include a usage prediction generator that may be configured predict hyper-scaler platform usage by a user. Server system 110 may start with last year usage as a default. Server system 110 may solicit and receive user input about updated information, at step 620. If further information regarding the future usage is known to the user, server system 1110 may update the prediction by receiving modified information by the user through the GUI.

Figure 10:
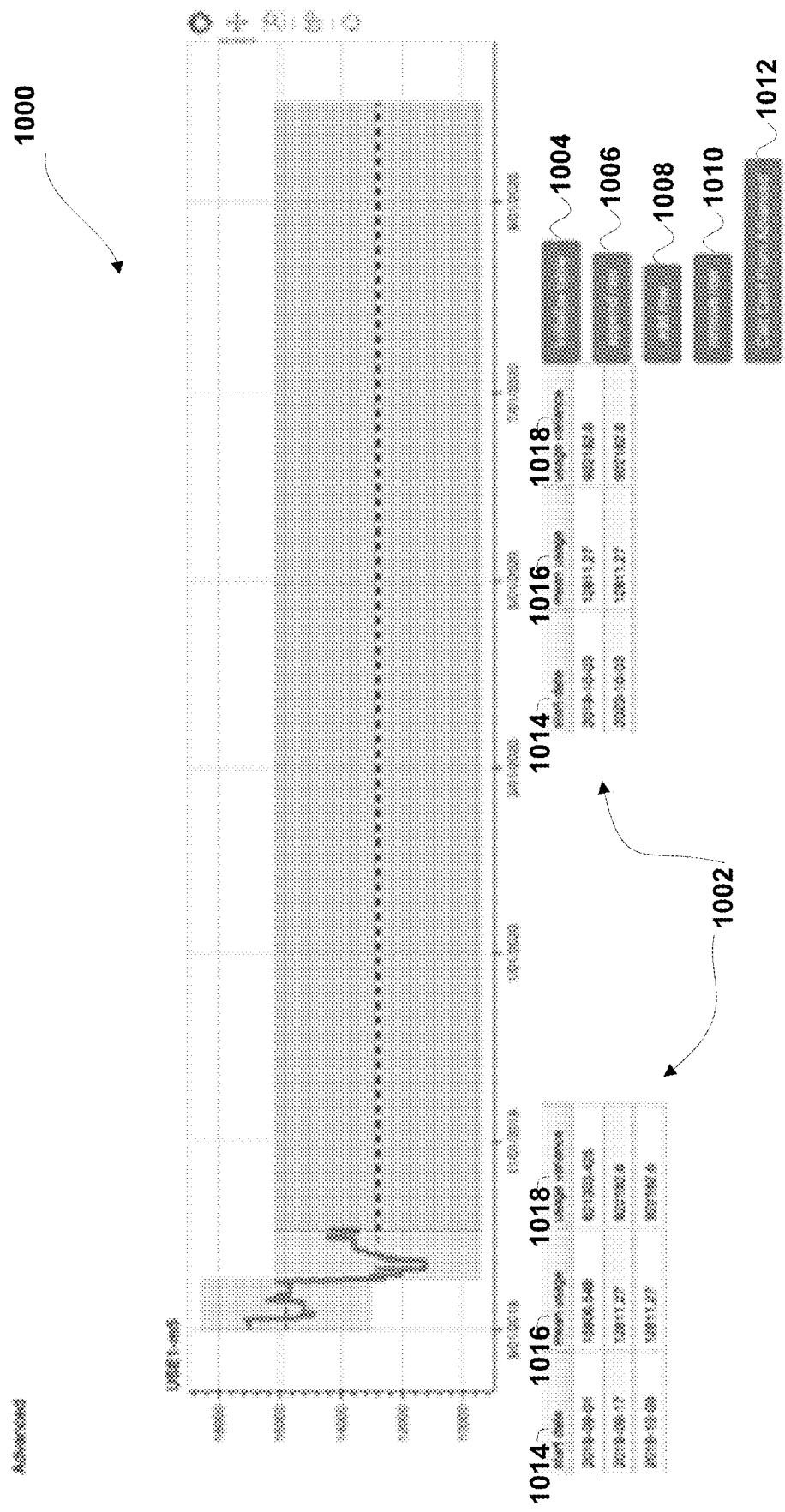
FIG. 10 illustrates an exemplary graph and chart illustrating expected future hyper-scaler platform usage based on user input according to the present embodiments.

FIG. 10 illustrates an exemplary graph 1000 and chart 1002 illustrating expected future hyper-scaler platform usage based on user input according to the present embodiments. A user may input, into a GUI, by interacting with buttons 1004-1012. A table may be initialized using button 1004. The table may be initialized with previously obtained usage data that may populate table 1002 and graph 1000. Raw data may be appended using button 1006. Rows may be added to chart 1002 using button 1008 and removed using button 1010. A user may calculate the cost and an optimal number of machines to reserve based on chart 1002 using button 1012. Chart 1002 includes columns including a start date 1014, mean usage 1016, and usage variance 1018. A user may enter data into the foregoing columns and graph 1000 may be updated by server system 110. The entered data may be based on (or copied from) prior usage information presented to the user.

Returning to FIG. 6, server system 110 may include a statistical cost optimizer module. The statistical cost optimizer module may perform a deterministic cost prediction that optimizes the number of reservations based on the previous usage data as reference, at step 622.

The deterministic cost prediction algorithm may look at a reference period (e.g., a month, a quarter, a year, two years, three years, etc.) and finds the cost per reservation number. The optimal number of reservation selected is the one yielding the lowest cost. In some examples, there may be multiple reservation lengths (e.g., 1 year and 3 year) with different costs that may be factored into the algorithm. While finding the optimal point is described, the cost of the sub-optimal points is also calculated empirically to present the user with the trade off in cost. Server system 110 may present the tradeoff costs in a cost tradeoff graph. The deterministic cost, $C_{cost}$, calculation is done as follows per hypothetical $n_{res}$:

$$C_{cost}[n_{res}] = C_{res}\sum_{t=0}^{T} N_t + \sum_{t=0}^{T} C_{res}(n_{res} - N_t)I_{n_{res}>N_t} + \sum_{t=0}^{T}(C_D - C_{res})[N_t - n_{res}]I_{N_t>n_{res}}$$

$$= \sum_{t=0}^{T} C_{res}n_{res} + \sum_{t=0}^{T} C_D[N_t - n_{res}]I_{N_t>n_{res}}$$

(1)

where $C_{res}$ is the instance reservation cost per instance per hour. $C_D$ is on demand cost per instance per hour. t is time in hours. $n_{res}$ is the number of hypothetical reservations. $N_t$ is the actual usage at time t and is known from the reference period. $N_t$ may be determined based on the generated usage report (at step 606). $I_{Nt>nres}$ is an indicator that is set to '1' if the number of actually used instances is larger than the reservation. $I_{nres>Nt}$ is an indicator that is set to '1' if the reservation is larger than the number of actually used instances T is the duration of the reference period.

The optimal number of reservation is the one that minimizes the above expression (formula 1):

$$n_{res,optimal} = \operatorname*{argmin}_{n_{res}}\{C_{cost}[n_{res}]\} = N_{t,sorted}[n_x]$$

(2)

where $N_{t,sorted}$ are the sorted values of the usage along the year, $n_x$ is the index of the sorted values, $n_{res,optimal}$ is the optimal number of reservations, and argmin is a minimization function that returns the minimum value in the array $C_{cost}$, as follows:

$$n_x = \left(1 - \frac{C_{res}}{C_D}\right) \cdot T$$

(3)

The statistical cost optimizer module may perform a probabilistic cost prediction that optimizes the number of reservations based on previous usage as well as user input of estimated future usage (e.g., an estimated usage pattern), at step 624.

In the probabilistic algorithm, the usage pattern $N_t$ comes from the user input (at step 620). Since the usage is in the future, there may exist some degree of uncertainty. To address this, the user may input a series of expected mean usage and standard deviations in the coming year via e.g., a GUI interface. For example, the user may enter for January 1st until March 1 the mean is 50 machines, and the standard deviation is +/−5 machines. This may account for shut down periods, upscale experiments, etc. The expected cost in this case may be calculated as follows:

$$\widetilde{Cost}[n_{res}] = + \sum_{k=0}^{N_{periods}} T_{period,k} \cdot C_{res}n_{res} - \\ + \sum_{k=0}^{N_{periods}} T_{period,k} \cdot C_d\left[+\frac{\sigma}{\sqrt{2\pi}}\exp\left(-\frac{(n_{res}-\mu_k)^2}{2\sigma_k^2}\right)\right] - \\ [n_{res}-\mu_k]\cdot\left[0.5 - 0.5\cdot\operatorname{erf}\left(\frac{n_{res}-\mu_k}{\sqrt{2}\,\sigma_k}\right)\right]$$

(4)

where $$n_{res,optimal} = \operatorname*{argmin}_{n_{res}}\{\widetilde{C}_{cost}[n_{res}]\}$$

(5)

is the optimal number of reservations. $N_{periods}$ is the number of periods with a distinct usage pattern (e.g. a shutdown with no usage would account for such a usage pattern). A distinct usage pattern may be defined by its duration, a constant mean and a constant variance within the period, as will be further discussed herein (see e.g., FIG. 6A). $T_{period,k}$ is the duration of the $k^{th}$ distinct usage pattern period expressed in hours (or some other period, e g minutes, days, weeks). It may, for example, be in the order of a few to several weeks in length. $C_{res}$ and $C_d$ are the hourly (or some other period) costs (cost/hour) for a single reserved and on-demand instance, respectively. $n_{res}$ is the number of instance reserved for the following period (e.g. year), $\mu_k$ is the average number of reserved instances in the $k^{th}$ period. $\sigma_k^2$ is the variance of the number of instances used in the $k^{th}$ period. er f is an error function. argmin is a minimization function that returns the minimum value in the array $C_{cost}$. In some examples, there may be multiple reservation lengths (e.g., 1 year and 3 year) with different costs that may be factored into the algorithm.

The deterministic and probabilistic algorithms are discussed in further detail below.

Server system 110 may display a predicted optimal number of reservations, a predicted cost of use of the hyperscaler platform, and/or a chart illustrating a cost per number of reservation trade-off based on the cost prediction calculated in steps 622 and 624.

Figure 11:
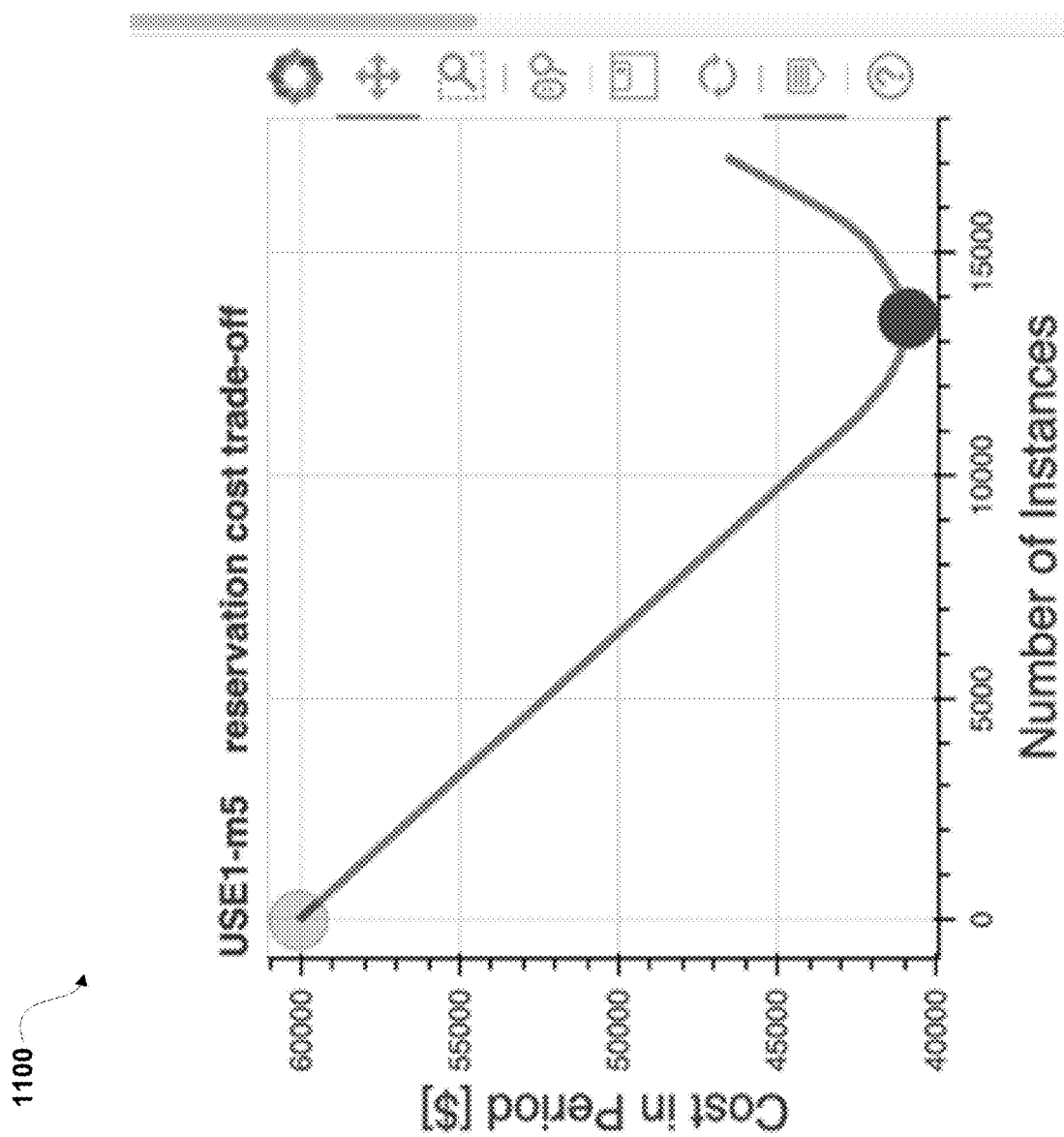
FIG. 11 illustrates an exemplary graph showing reservation cost tradeoff according to the present embodiments.

FIG. 11 illustrates an exemplary graph 1100 showing reservation cost tradeoff according to the present embodiments. After server system 110 calculates the cost $C_{cost}[n_{res}]$ based on a range of reserved instances (for many values of $n_{res}$) based on either the disclosed deterministic algorithm (of step 622) or the probabilistic algorithm (of step 624; including user input), server system 110 may generate graph 1100 illustrating an optimal number of instances to reserve and the cost of that optimal number of instances as well as sub-optimal reservation amounts (because of either reserving too few or too many instances) and costs. While reserving a different number of instances than recommended may be "sub-optimal" based on the particular inputs (past data and/or predicted data from user input), a user may wish to reserve a smaller or larger number of instances in order to limit fixed costs, take a more cautious approach to reservations, or limit a likelihood of cost overruns.

A user may reserve the recommended (e.g. calculated optimal) number or a different number of reserved instances using server system 110 for the hyper-scaler platform. In some examples, multiple reservations (for different kinds of instance types) may be made at one time. Alternatively, the user may reserve the reserve instances directly with hyper-scaler platform.

Example Operations

In embodiments of the present disclosure, optimization of the deterministic and probabilistic algorithms is described. Stochastic Optimization when the Mean is Constant In examples where the mean expectation is constant, the optimization relies on the mean expectation and variance of a regression-based predictor for the number of machines to be used in the future.

Figure 12:
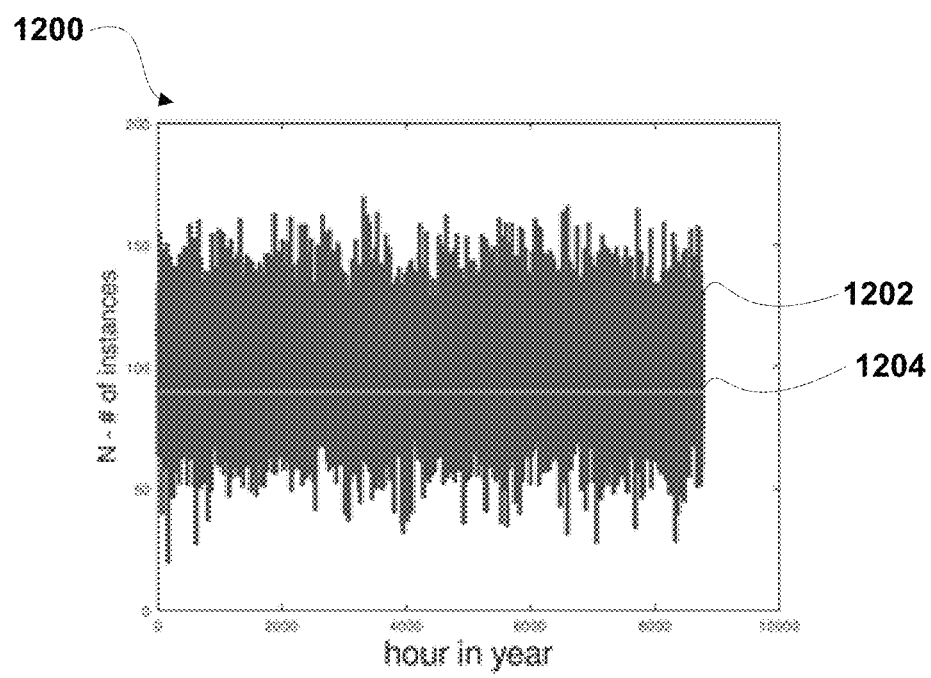
FIG. 12 illustrates an exemplary relationship between the number of instances used by hour of the year according to the present embodiments.
Figure 13:
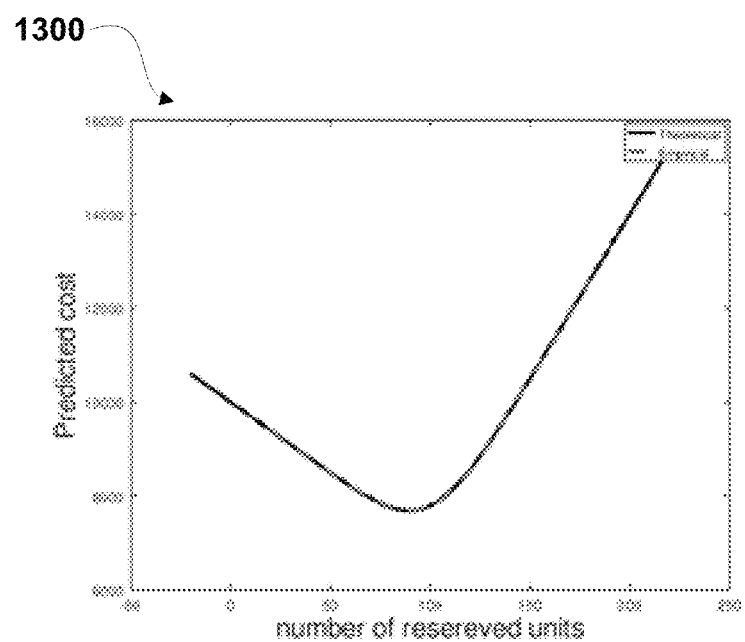
FIG. 13 illustrates an exemplary graph showing reservation cost tradeoff according to the present embodiments.

FIG. 12 illustrates an exemplary graph 1200 showing a relationship between the number of instances used by hour of the year according to the present embodiments. Graph 1200 shows the actual number of machines used in each hour over the year 1202 and the recommended number of reserved machines 1204 (90 machines). FIG. 13 illustrates an exemplary graph 1300 showing reservation cost tradeoff according to the present embodiments. Graph 1300 shows empirical versus analytically calculated cost as function of number of reserved instances. In the described example of FIGS. 12 and 13, usage and predicted vs actual cost for conditions $N^-=100$, Cres=70, $C_d=100$, $\sigma=20$ are shown. The minimal cost is 7695.4 which is achieved when the number of reserved instances is $n_{res}=N^-+\alpha\sigma=89.600$. Described is the method for finding the level of line 1204.

A user may wish to reserve $n_{res}$ instances for a year such that that the cost will be minimized. The following are parameters in determining the optimal value for $n_{res}$:

1) $C_{res}$—The cost of reserving one machine hour.
2) $C_D$—The cost of purchasing a machine on demand.
3) $N^-$—The average number of machines that was is used.
4) $\sigma^2$—The variance of the number of machine hours to be used ($N^-$). using regression
5) $n_{res}=N^-+\alpha\sigma$—The total number of machines that were reserved.

The optimal number of machines to be reserved is $n_{res}=N^-+\alpha\sigma$ with $\alpha$ defined as follows:

$$\alpha = \underset{\alpha}{\operatorname{argmin}} \, \underset{n}{E} \{C_{total}\} \quad (6)$$

$$= \underset{\alpha}{\operatorname{argmin}}$$

$$\frac{C_{res}}{o} \overline{N} + C_D \cdot \frac{\sigma}{\sqrt{2\pi}} \exp\left(-\frac{\alpha^2\sigma^2}{2\sigma^2}\right) -$$

$$C_{res} \cdot \alpha\sigma \cdot \operatorname{erf}\left(\frac{\alpha\sigma}{\sqrt{2}\sigma}\right) +$$

$$C_D \cdot \alpha\sigma \cdot \left[\frac{1}{2} - \frac{1}{2}\operatorname{erf}\left(\frac{\alpha\sigma}{\sqrt{2}\sigma}\right)\right]$$

Proof. In the following proof N represents the number of simultaneously used machines.

$$C_{total}=C_{res}N+C_{res}\cdot(n_{res}N)\cdot I_{n_{res}>N}+(C_D-C_{res})\cdot(N-n_{res})\cdot I_{n_{res}<N} \quad (7)$$

$$n_{res}=N^-+\alpha\sigma, \quad (8)$$

Such that the bias of the cost estimator is:

$$b=\alpha\sigma \quad (9)$$

$$C_{total}=E\{C_{res}n+C_{res}\cdot(n_{res}-n)\cdot I_{n_{res}>n}+(C_D-C_{res})\cdot(n-n_{res})\cdot I_{n_{res}<N}\}=+C_{res}$$
$$\overline{N}+E\{C_{res}\cdot(n_{res}-n)\cdot I_{n_{res}>N}+C_{res}\cdot\alpha\sigma\cdot$$
$$I_{n_{res}>N}+(C_D-C_{res})\cdot(n-n_{res})\cdot I_{n_{res}<N}-(C_D-C_{res})\cdot\alpha\sigma I_{n_{res}<N}\} \quad (10)$$

The term of the third and fourth lines of equation (10) are as follows:

Term 1:

$$E\{(n_{res} - N) \cdot I_{n_{res}>N}\} = -\int_{-\infty}^{b} \frac{1}{\sqrt{2\pi}\,\sigma} x \cdot \exp\left(-\frac{x^2}{2\sigma^2}\right) = \quad (11)$$

$$+\frac{\sigma}{\sqrt{2\pi}}\exp\left(-\frac{x^2}{2\sigma^2}\right)\Big|_{-\infty}^{b} = +\frac{\sigma}{\sqrt{2\pi}}\exp\left(-\frac{\alpha^2\sigma^2}{2\sigma^2}\right)$$

Term 2

$$E\{C_{res} \cdot \alpha\sigma \cdot I_{n_{res}>N}\} = C_{res} \cdot \alpha\sigma \cdot \left[\frac{1}{2} + \frac{1}{2}\operatorname{erf}\left(\frac{\alpha\sigma}{\sqrt{2}\,\sigma}\right)\right] \quad (12)$$

Term 3

$$E\{(N - \hat{N}) \cdot I_{n_{res}<N}\} = \int_{b}^{\infty} \frac{1}{\sqrt{2\pi}\,\sigma} x \cdot \exp\left(-\frac{x^2}{2\sigma^2}\right) = \quad (13)$$

$$-\frac{\sigma}{\sqrt{2\pi}}\exp\left(-\frac{x^2}{2\sigma^2}\right)\Big|_{b}^{\infty} = \frac{\sigma}{\sqrt{2\pi}}\exp\left(-\frac{\alpha^2\sigma^2}{2\sigma^2}\right)$$

Term 4

$$E\{(C_D - C_{res}) \cdot \alpha\sigma \cdot I_{n_{res}<N}\} = (C_D - C_{res}) \cdot \alpha\sigma \cdot \left[\frac{1}{2} - \frac{1}{2}\operatorname{erf}\left(\frac{\alpha\sigma}{\sqrt{2}\,\sigma}\right)\right] \quad (14)$$

Summing the Above Terms:

$$E\{C_{total}\} = +C_{res}\hat{N} + \quad (15)$$

$$+C_{res} \cdot \frac{\sigma}{\sqrt{2\pi}}\exp\left(-\frac{\alpha^2\sigma^2}{2\sigma^2}\right) + C_{res} \cdot \alpha\sigma\left[\frac{1}{2} + \frac{1}{2}\operatorname{erf}\left(\frac{\alpha\sigma}{\sqrt{2}\,\sigma}\right)\right]$$

$$+(C_D - C_{res}) \cdot \frac{\sigma}{\sqrt{2\pi}}\exp\left(-\frac{\alpha^2\sigma^2}{2\sigma^2}\right) -$$

$$(C_D - C_{res}) \cdot \alpha\sigma \cdot \left[\frac{1}{2} - \frac{1}{2}\operatorname{erf}\left(\frac{\alpha\sigma}{\sqrt{2}\,\sigma}\right)\right]$$

$$E\{C_{total}\} = C_{res}N + C_D \cdot \frac{\sigma}{\sqrt{2\pi}}\exp\left(-\frac{\alpha^2\sigma^2}{2\sigma^2}\right) + \quad (16)$$

$$C_{res} \cdot \alpha\sigma - C_D \cdot \alpha\sigma \cdot \left[\frac{1}{2} + \frac{1}{2}\operatorname{erf}\left(\frac{\alpha\sigma}{\sqrt{2}\,\sigma}\right)\right]$$

Optimal Number of Reservations when the Mean and Variance Change in Time

In some usage reports, the mean and variance of usage may changes from time to time. Thus, the statistical description of the usage pattern may not be stationary but vary in time. The cost of the time dependent case follows the following expression:

$$\widehat{Cost} = + \sum_{k=0}^{N_{periods}} T_{period,k} \cdot C_{res} \cdot n_{res} - \qquad (17)$$

$$+ \sum_{k=0}^{N_{periods}} T_{period,k} \cdot C_d \left[ + \frac{\sigma}{\sqrt{2\pi}} \exp\left(-\frac{(n_{res}-\mu_k)^2}{2\sigma^2}\right) - \right.$$

$$\left. [n_{res} - \mu_k] \cdot \left[0.5 - 0.5 \cdot \text{erf}\left(\frac{n_{res}-\mu_k}{\sqrt{2}\,\sigma_k}\right)\right] \right]$$

where: $N_{res}$ is the number of instance reserved for the following year (or other period), $\mu_k$ and $\sigma^2_k$ are the mean and variance of the number of instance in the kth period, respectively.

Proof. In the following proof N[t] represents the number of simultaneously used machines.

$$C_{total} = \sum_{t=0}^{N_{hr}} C_{res} N[t] + C_{res} \cdot (n_{res} - N[t]) \cdot I_{n_{res} > N[t]} + \qquad (18)$$

$$(C_D - C_{res}) \cdot (N[t] - n_{res}) \cdot I_{n_{res} < N[t]}$$

The averaged cost is as follows:

$$\overline{C}_{total} = \sum_{t=0}^{N_{hr}} C_{res}\mu_t + \qquad (19)$$

$$C_{res} \cdot n_{res} \cdot P(n_{res} - N[t] > 0) -$$

$$C_{res} \cdot \int_{-\infty}^{n_{res}} N_t P(n_{res} - N_t) dN_t$$

$$-(C_D - C_{res}) \cdot n_{res} \cdot P(n_{res} - N[t] < 0) +$$

$$+(C_D - C_{res}) \cdot \int_{n_{res}}^{\infty} N_t P(n_{res} - N[t]) dN_t$$

where P is the probability function, $N_{hr}$ is the number of hours (or other period) in the reference time period.

Term 2:

$$P(n_{res} - N[t] > 0) = 0.5 + 0.5 \cdot \text{erf}\left(\frac{n_{res}-\mu_t}{\sqrt{2}\,\sigma_t}\right) \qquad (20)$$

Term 3:

$$\int_{-\infty}^{n_{res}} N_t P(n_{res} - N_t) dN_t = \int_{-\infty}^{n_{res}} \frac{1}{\sqrt{2\pi}\,\sigma} x \cdot \exp\left(-\frac{(x-\mu_t)^2}{2\sigma^2}\right) dx \qquad (21)$$

$$= \int_{-\infty}^{n_{res}-\mu_t} \frac{1}{\sqrt{2\pi}\,\sigma} (x'-\mu_t) \cdot \exp\left(-\frac{x'^2}{2\sigma^2}\right) dx'$$

$$= -\frac{\sigma}{\sqrt{2\pi}} \exp\left(-\frac{x^2}{2\sigma^2}\right)\bigg|_{n_{res}-\mu_t}^{\infty} +$$

$$\mu_t \cdot \left[0.5 - 0.5 \cdot \text{erf}\left(\frac{n_{res}-\mu_t}{\sqrt{2}\,\sigma_t}\right)\right]$$

$$= -\frac{\sigma}{\sqrt{2\pi}} \exp\left(-\frac{(n_{res}-\mu_t)^2}{2\sigma^2}\right) +$$

$$\mu_t \cdot \left[0.5 - 0.5 \cdot \text{erf}\left(\frac{n_{res}-\mu_t}{\sqrt{2}\,\sigma_t}\right)\right]$$

Term 4:

$$P(N[t] - n_{res} > 0) = 0.5 + 0.5 \cdot \text{erf}\left(\frac{n_{res}-\mu_t}{\sqrt{2}\,\sigma_t}\right) \qquad (22)$$

Term 5:

$$\int_{n_{res}}^{\infty} N[t] P(n_{res} - N[t]) dN_t = \int_{n_{res}}^{\infty} \frac{1}{\sqrt{2\pi}\,\sigma} x \cdot \exp\left(-\frac{(x-\mu_t)^2}{2\sigma^2}\right) dx \qquad (23)$$

$$= \frac{\sigma}{\sqrt{2\pi}} \exp\left(-\frac{(n_{res}-\mu_t)^2}{2\sigma^2}\right) - \qquad (24)$$

$$\mu_t \cdot \left[0.5 - 0.5 \cdot \text{erf}\left(\frac{n_{res}-\mu_t}{\sqrt{2}\,\sigma_t}\right)\right]$$

Summing the Five Terms Together:

$$\widehat{Cost} = \sum_{t=0}^{N_{hr}} C_{res}\left[\mu_t + n_{res}\left[0.5 - 0.5 \cdot \text{erf}\left(\frac{n_{res}-\mu_t}{\sqrt{2}\,\sigma_t}\right)\right]+ \qquad (25)\right.$$

$$\frac{\sigma}{\sqrt{2\pi}} \exp\left(-\frac{(n_{res}-\mu_t)^2}{2\sigma^2}\right) -$$

$$\left. \mu_t \cdot \left[0.5 - 0.5 \cdot \text{erf}\left(\frac{n_{res}-\mu_t}{\sqrt{2}\,\sigma_t}\right)\right]\right]$$

$$\sum_{t=0}^{N_{hr}} (C_d - C_{res})\left[-n_{res}\left[0.5 - 0.5 \cdot \text{erf}\left(\frac{n_{res}-\mu_t}{\sqrt{2}\,\sigma_t}\right)\right]+\right.$$

$$\frac{\sigma}{\sqrt{2\pi}} \exp\left(-\frac{(n_{res}-\mu_t)^2}{2\sigma^2}\right) -$$

$$\left. \mu_t \cdot \left[0.5 - 0.5 \cdot \text{erf}\left(\frac{n_{res}-\mu_t}{\sqrt{2}\,\sigma_t}\right)\right]\right]$$

Collecting the Various Terms Together:

$$\widehat{Cost} = + \sum_{t=0}^{N_{hr}} C_{res} n_{res} - \qquad (26)$$

$$+ \sum_{t=0}^{N_{hr}} C_d \left[+\frac{\sigma_t}{\sqrt{2\pi}} \exp\left(-\frac{(n_{res}-\mu_t)^2}{2\sigma_t^2}\right) - \right.$$

$$\left. [n_{res} - \mu_t] \cdot \left[0.5 - 0.5 \cdot \text{erf}\left(\frac{n_{res}-\mu_t}{\sqrt{2}\,\sigma_t}\right)\right]\right]$$

Note that the Constant Mean Case Described Above is a Sub-Case:

$$E\{C_{total}\} = C_{res}N + C_D \frac{\sigma}{\sqrt{2\pi}} \exp\left(-\frac{\alpha^2\sigma^2}{2\sigma^2}\right) + \qquad (27)$$

$$C_{res} \cdot \alpha\sigma - C_D \cdot \alpha\sigma \cdot \left[\frac{1}{2} - \frac{1}{2}erf\left(\frac{\alpha\sigma}{\sqrt{2}\,\sigma}\right)\right]$$

Finding the Minimal Point in the Non-Random (Deterministic) Case

Where the hourly usage is known with certainty (or near certainty) and the server system 110 attempts to determine how many devices should be reserved, the following steps may be used. In this case, the algorithm for finding the optimal number of reservations (e.g. the minimum point in FIG. 11) is as follows:

1) Determine a time series of number of instances active per hour (or some other time period), in a time period of T hours (e.g., one year, or one month).

2) Sort the time series of number of instances from small to large. The new index n is no longer chronological but rather based on the number of instances.

$N_{t,sorted}$=list of number of instances used per hour sorted by number of instances from small to large (28)

3) Find the x-axis entry such that:

$$n_x = \left(1 - \frac{C_{res}}{C_D}\right) \cdot T \qquad (29)$$

4) Find the number of instances at $n_x$:

$$N_{res,opt} = N_{i,sorted}[n_x] \qquad (30)$$

for example, server system 110 may choose the number of instances that appear at index location $n_x$ of the sorted list.

Figure 14A:
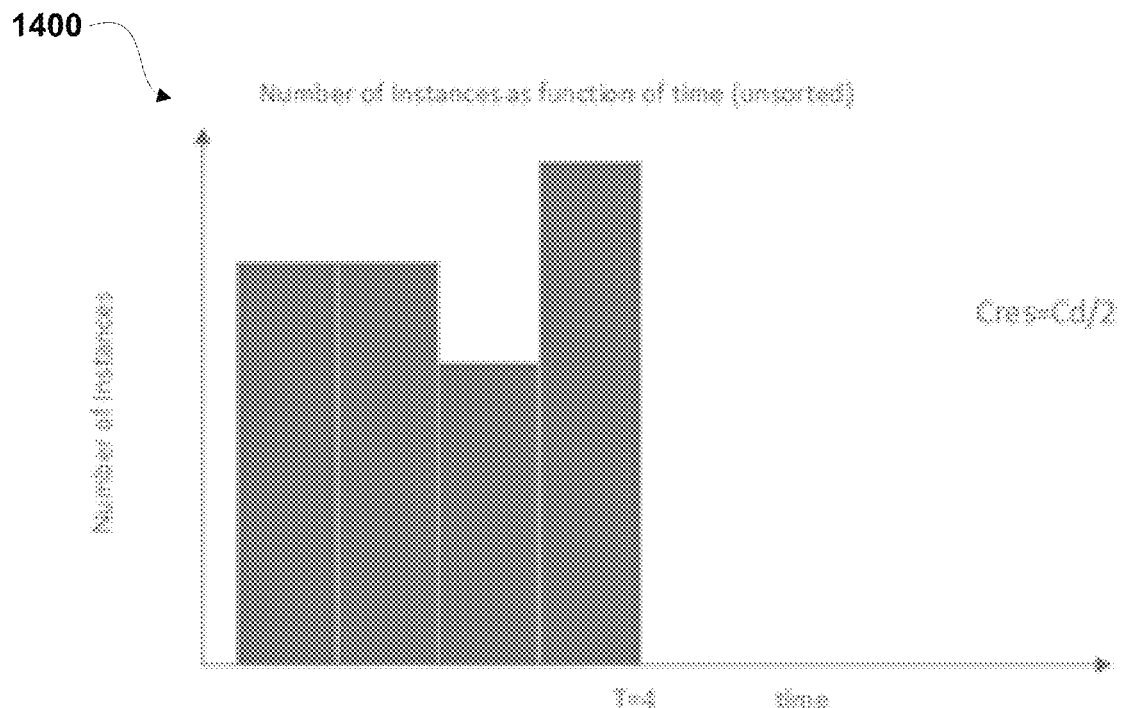
FIG. 14A illustrates a chart showing the number of instances as a function of time according to present embodiments.
Figure 14B:
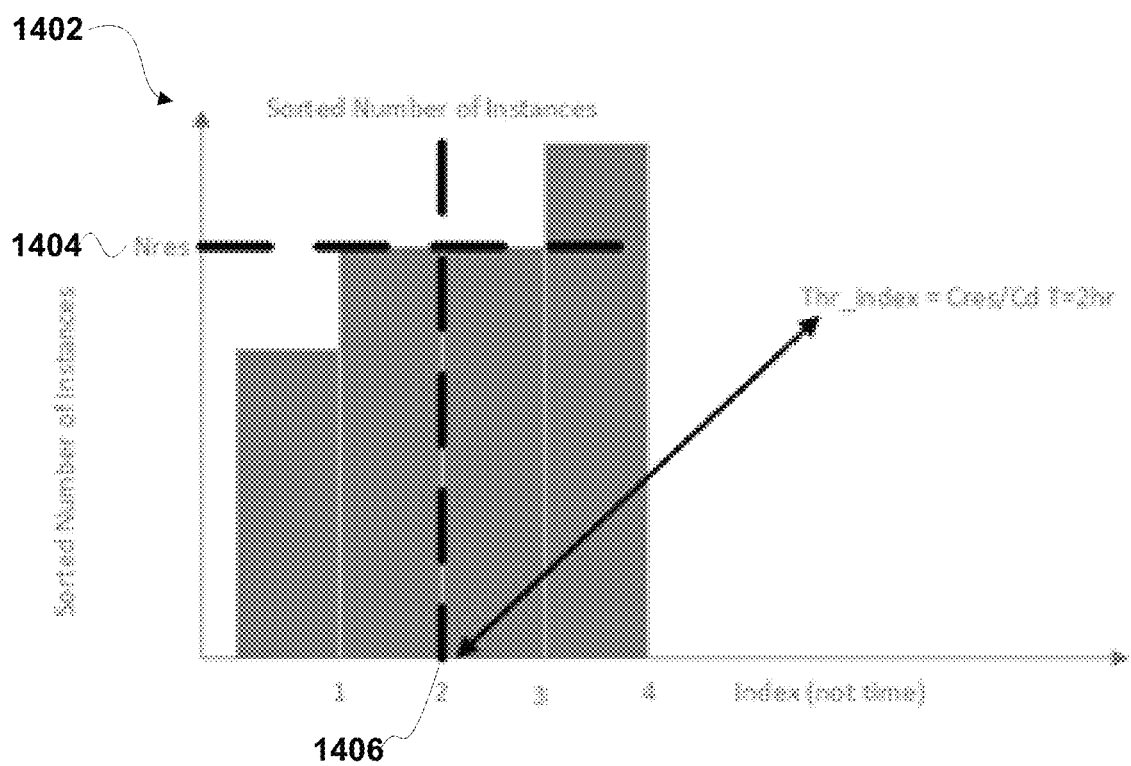
FIG. 14B illustrates a chart showing the number of instances sorted by the number of instances used according to present embodiments.

FIG. 14A and FIG. 14B illustrates charts 1400 and 1402 showing the number of instances as a function of time unsorted (in chart 1400 of FIG. 14A) and sorted (in chart 1402 of FIG. 14B) according to present embodiments. Chart 1402 also indicates $N_{res}$ 1404 and an index value 1406 of the optimal histogram index, calculated as Thr_index=(Cres/$C_d$)×T. The x-axis length of the histogram is the number of hours in the reference period. Each x-axis-index represents an hour (or another time period) but not in chronological order (because the order was sorted according to usage not time). The y-values are the sorted number of simultaneously used instances per hour (or another period). The total number of hours is 4. The identified optimal usage value is the y-value at the middle (where x=2).

To calculate Thr_index: Plot the number of instances used along the period of interest as function of time using 1 hour (or some other period) temporal resolution (number of instances per hour of the year). Then, sort the number of instances from the smallest to largest. For example, after the sorting you have 365×24 hours in a year, but only 4 hours in the illustrated examples of FIGS. 14A and 14B). In this specific example, $C_{res}/C_d$=0.5, so (1-$C_{res}/C_d$)=0.5 as well, and the optimal values is the number of instances in the middle of the sorted histogram. Since there are only 4 hours (T) in the example, the middle of the histogram is at the second index. The value of the sorted histogram at the second index is optimal number of reserved instances. So, the optimal index is 2, and the optimal number of reserved instances is the value of the sorted histogram at the second entry, Histogram_sorted [Thr_index=2].

Figure 15:
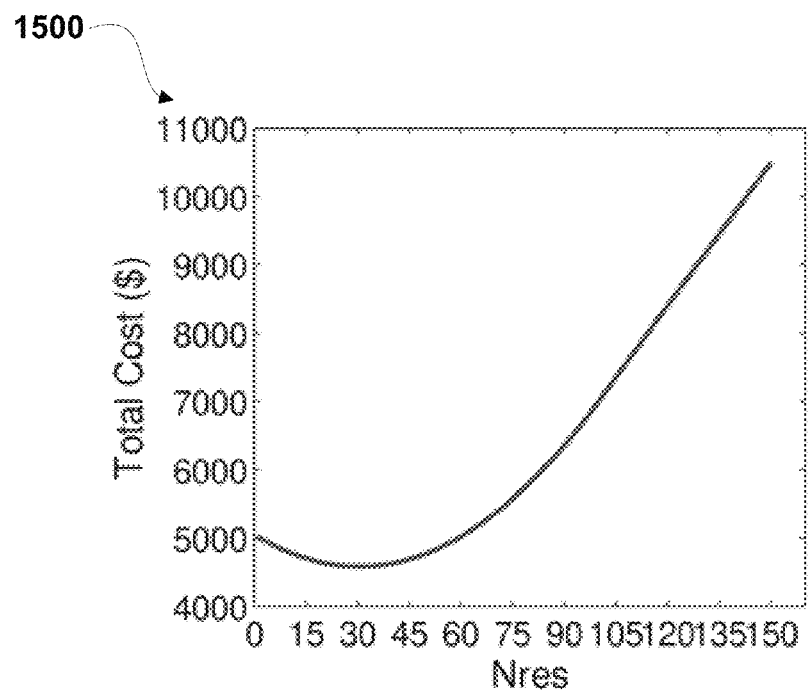
FIG. 15 illustrates an exemplary graph showing reservation cost tradeoff according to the present embodiments.

FIG. 15 illustrates an exemplary graph 1500 showing reservation cost tradeoff according to the present embodiments. In the illustrated example, $C_{res}$=$0.7, $C_D$=$1.0, $C_{res}/C_d$=0.7, $N_i$=[1, 2, 3, . . . , 100] (in this simplified example, the reservation period may 100 hours instead of a year). $N_i$ is the number of instances per hour in the period of interest. $N_{res}$ is the number of reserved instances. Using equation (37), described below, the calculated optimal number of reserved instances is: $TN_i>n_{res}/T$=0.7→$n_{res}$=30, which optimizes hyper-scaler platform costs. This is because the optimal number of reservations occurs when the actual usage is 0.7 (=70%) of the time larger than the number of reservations and only 30% of the time lower than the reservation. Since the actual usage pattern is 1, 2, 3, 4, . . . , 99, 100, the number 30 is 30% of the time equal or larger than the actual usage and 70% smaller than the actual usage. Thus, 30 is calculated as the optimal number of instance reservations.

Figure 16:
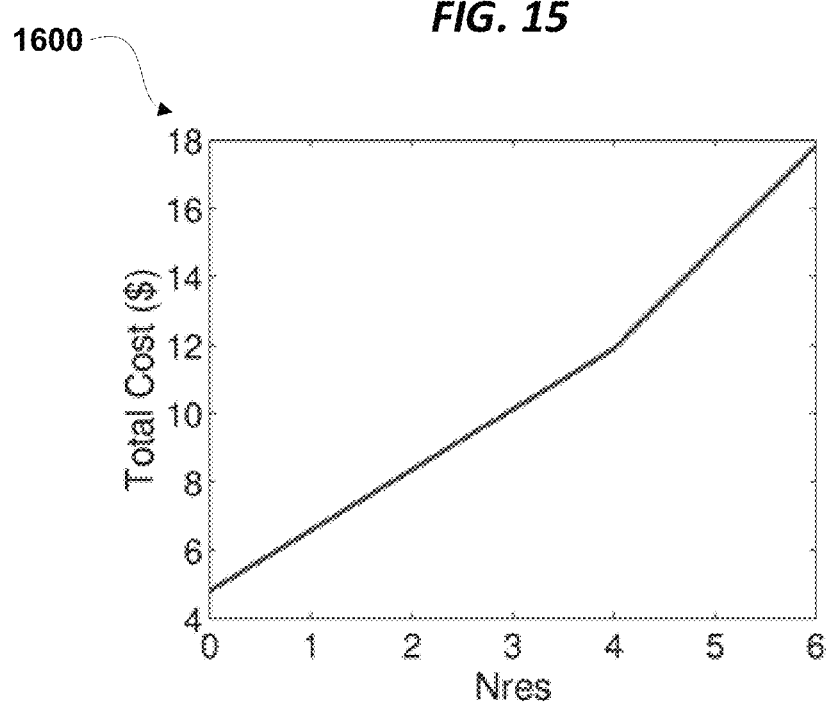
FIG. 16 illustrates an exemplary relationship between cost and $N_{res}$.

FIG. 16 illustrates an exemplary graph 1600 showing a relationship between cost and the $N_{res}$. In the illustrated example, $C_{res}$=0.1239, $C_D$=0.2$, $N_i$=[4, 4, 4, 4, 4, 4, 0, 0 . . . , 0] (in this simplified example the reservation period is 24 hours instead of, for example, a year). Using equation (37), defined below: $T_{Ni>nres}/T$=$C_{res}/Cd$=0.61;→index opt (the optimal index)=24*0.39=9. $N_{i,sorted}[9]$=0. The value of the sorted usage histogram at the "index opt" is the optimal number of reserved instances. Note, the index is not the value itself but rather the x-axis location of the optimal value.

Proof.

$$\widetilde{C_{cost}} = C_{res}\sum_{i=0}^{T} N_i + \sum_{i=0}^{T} C_{res}(n_{res} - N_i)I_{n_{res}>N_i} + \qquad (31)$$

$$\sum_{i=0}^{T} (C_D - C_{res})[N_i - n_{res}]I_{N_i>n_{res}}$$

Differentiating with Respect to $N_{Res}$:

$$\frac{\partial \widetilde{C_{cost}}}{\partial n_{res}} = +\sum_{i=0}^{T} C_{res}I_{n_{res}>N_t} + \qquad (32)$$

$$\sum_{i=0}^{T} \underbrace{\frac{C_{res}(n_{res} - N_i)\delta[n_{res} - N_i]}{\text{This term is zero}}}$$

$$+\sum_{i=0}^{T} -[C_D - C_{res}]I_{N_t>n_{res}}$$

$$-\sum_{i=0}^{T} \underbrace{\frac{[C_D - C_{res}](N_i - n_{res})\delta[N_i - n_{res}] \cdot (-1)}{\text{This term is also zero}}}$$

$$= 0$$

$$+\sum_{i=0}^{T} C_{res}I_{n_{res}} > N_i + \sum_{i=0}^{T} -[C_D - C_{res}]I_{N_i>n_{res}} = 0 \qquad (33)$$

$$I_{n_{res}>N_i} = 1 - I_{N_i>n_{res}} \qquad (34)$$

$$+\sum_{i=0}^{T} C_{res} \cdot 1 - \sum_{i=0}^{T} C_{res} \cdot I_{N_i>n_{res}} + \sum_{i=0}^{T} -[C_D - C_{res}]I_{N_i>n_{res}} = 0 \qquad (35)$$

$$+\sum_{i=0}^{T} C_{res} = \sum_{i=0}^{T} C_D I_{N_i>n_{res}} \qquad (36)$$

$$n_{res}: \frac{T_{N_i>n_{res}}}{T} = \frac{C_{res}}{C_D} \Leftrightarrow \frac{T_{N_i<n_{res}}}{T} = 1 - \frac{C_{res}}{C_D} \qquad (37)$$

Example Method

Figure 17:
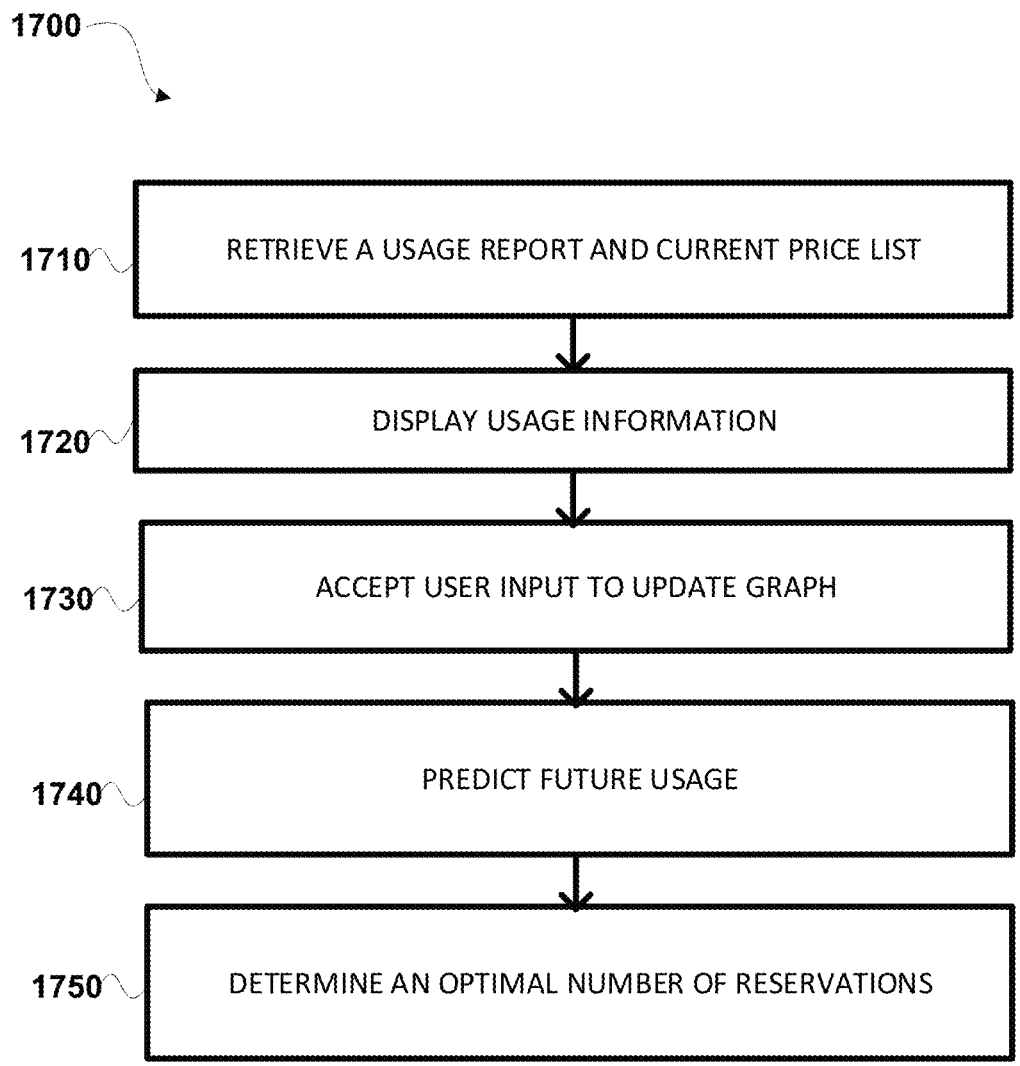
FIG. 17 is a simplified diagram of an example method of determining an optimal number of hyper-scaler reserved machines according to one embodiment.

FIG. 17 is a simplified diagram of an example method 1700 of determining an optimal number of hyper-scaler reserved machines according to one embodiment. In the example of FIG. 17, an optimal number is not limited to a number of hyper-scaler reserved machines that results in a lowest cost or best performance under all circumstances. Rather, the optimal number refers to an appropriate number of hyper-scaler reserved machines based on cloud provider terms and predicted future usage. Method 1700 is not meant to be limiting and may be used in other applications. Server systems 110 and 120, client system 160, and a hyper-scaler platform 140 may perform method 1700 (and include the described modules), however for simplicity, the steps are described as being performed by server system 110 and its components.

Method 1700 includes blocks 1710-1750. At block 1710, system 110 may retrieve a current price list of a plurality of cloud computing costs of a cloud computing provider and/or a usage report of cloud services. The cloud computing provider may include a hyper-scaler platform such as hyper-scaler platform 140. At block 1720, system 110 may display usage information via a graphical user interface (GUI) based on the usage report as a graph of past usage. The GUI may include a dashboard interface.

At block 1730, system 110 may display, in the GUI, the graph of past usage that can accept user input of a function based on expected future use to make an updated graph. System 110 may accept user input to update the graph based on known or estimated increased or decreased usage over a period of time. The function may be a function with a mean and variance and a time period (or start time). The function may include one or more linear functions, etc. In some examples, the user may draw the usage on the graph. In another example, the user may enter attributes (e.g., a mean/variance) on a form, chart or spreadsheet interface. The prediction of future usage may use the updated user data input at step 1730 as parameters to update the graph.

At block 1740, system 110 may predict future usage based on the usage report and the updated graph. The usage report may be generated from user usage data scrapped or downloaded from the cloud platform. The data in the usage report may be sorted by instance type and size. A family aggregated report may be generated for different device categories offered by the cloud platform.

At block 1750, system 110 may determine an optimal number of reservations based on the predicted future usage and the retrieved current price list. An optimal number of reservations may be performed by minimizing a cost determination algorithm. The optimal number of reservations may use at least a deterministic and/or a probabilistic algorithm, discussed in more detail above. The determination It is also understood that additional processes may be performed before, during, or after blocks 1710-1750 discussed above. It is also understood that one or more of the blocks of method 1700 described herein may be omitted, combined, or performed in a different sequence as desired.

Example Architecture

Figure 18:
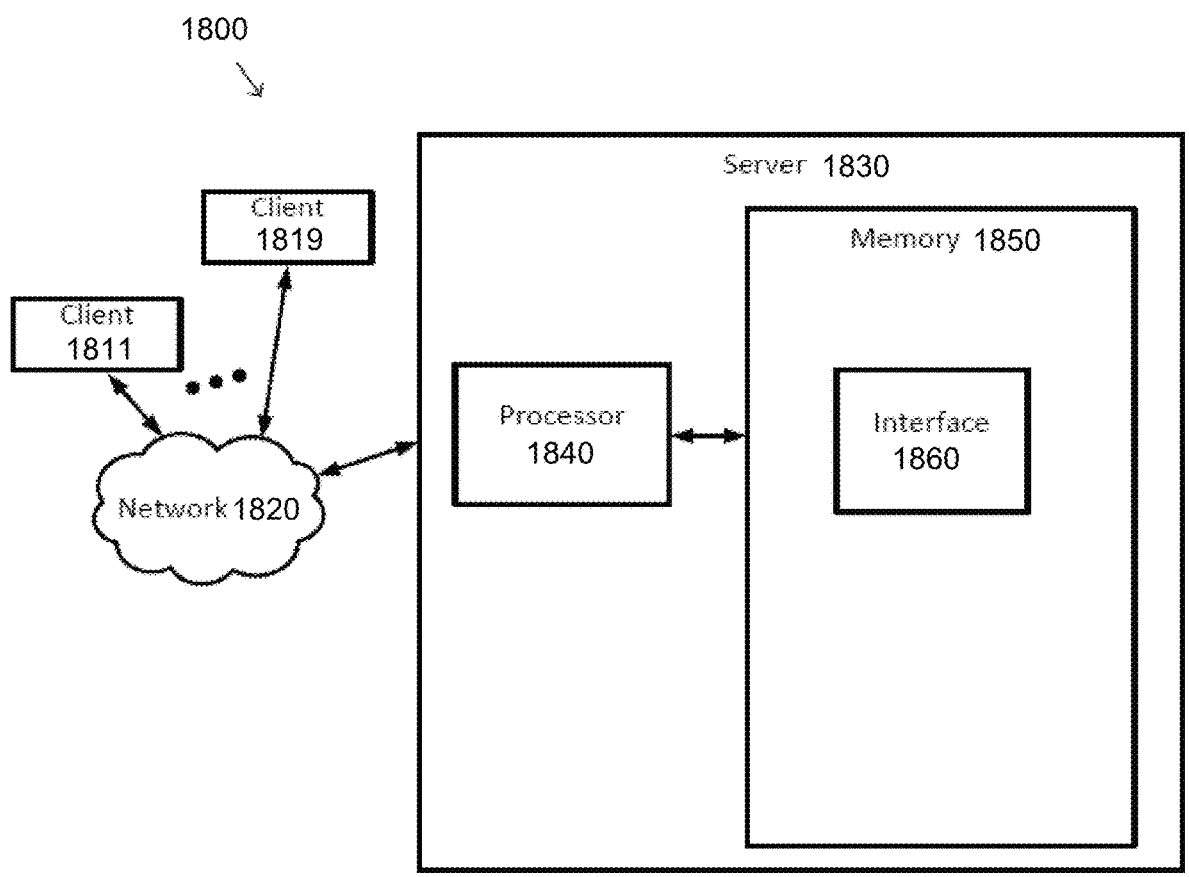
FIG. 18 is a simplified diagram of an example architecture according to one embodiment.

FIG. 18 is a simplified diagram of an example architecture 1800. As shown in FIG. 18, architecture 1800 is built around a client-service model. In architecture 1800, requests originate from one or more clients 1811-1819. Each of the clients 1811-1819 may make requests through a network 1820 to a server 1830.

In some embodiments, any of the clients may be system monitoring tool 117 or 127 (FIG. 1) and the server 1830 may be server 110 or 120 (FIG. 1). In an alternative embodiment, system monitoring tool 117 or 127 may be a client that runs on server 1830, which is consistent with the FIG. 1 example above. In some embodiments, any of the clients may be dashboard manager 119 (FIG. 1) and the server 1830 may be server 110 or 120 (FIG. 1). In an alternative embodiment, dashboard manager 119 or 129 may be a client that runs on server 1830, which is consistent with the FIG. 1 example above. The scope of embodiments is not limited to any particular architecture.

Network 1820 may be any kind of network including a local area network (LAN), such as an Ethernet, and/or a wide area network (WAN), such as the Internet. In some examples, server 1830 may be a standalone workstation, a cluster, a production server, within a virtual machine, and/or the like. Server 1830 includes a processor 1840 coupled to memory 1850. In some examples, processor 1840 may control operation and/or execution of hardware and/or software on server 2130. Although only one processor 1840 is shown, server 1830 may include multiple processors, CPUs, multi-core processors, field programmable gate arrays (FPGAs), application specific integrated circuits (ASICs), and/or the like. Memory 1850 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Memory 1850 may be used to store an interface 1860 that is used by clients 1811-1819 to access the storage resource information with clients 1811-1819 being able to make requests for all, or part, of the storage resource information, pricing, and usage information. Each of the requests is directed to interface 1860 where the requested storage resource information is retrieved, and a response is returned to the requesting client 1811-1819. Numerous mechanisms for directing the requests to interface 1860 may be used, including using a parameterized and/or unparameterized uniform resource locator (URL), using an application name corresponding to interface 1860, and/or the like. The requests may also be made using protocols or methods such as application programming interface (API) calls, remote procedure calls, representational state transfer (REST) web services, simple object access protocol (SOAP) web services, and/or the like.

As discussed above and further emphasized here, FIG. 18 is merely an example which should not unduly limit the scope of the claims. One of ordinary skill in the art would recognize many variations, alternatives, and modifications. In some embodiments, other configurations may be used with architecture 1800. In some examples, any of the clients 1811-1819 may be hosted in server 1830. In some examples, the storage resource information may be stored outside of memory 1850 or server 1830. For example, the storage resource information, pricing information, and/or usage information may be stored in one or more files in a storage module hosted in server 1830 or in another computing device elsewhere in architecture 1800. As another example, the storage resource information may be stored in one or more databases stored in one or more database management systems. In some examples, processor 1840 and memory 1850 may be hosted in a virtual machine.

It should be noted that the examples above are given in the context of a network storage system, through the scope of embodiments is not so limited. Rather, the concepts described above may be implemented in any type of computing cluster, where performance data is sampled and analyzed. One example embodiment includes a cluster of server nodes, where performance data for the server nodes themselves, as well as for the applications running on the server nodes, is sampled according to the workload of each node or application.

When implemented via computer-executable instructions, various elements of embodiments of the present disclosure are in essence the software code defining the operations of such various elements. The executable instructions or software code may be obtained from a non-transient, tangible readable medium (e.g., a hard drive media, optical media, RAM, EPROM, EEPROM, tape media, cartridge media, flash memory, ROM, memory stick, network storage device, and/or the like). In fact, readable media can include any medium that can store information.

In the embodiments described above, example clients 160, server 110, storage controllers 101, hyper-scaler platforms 140, and server 1830 include processor-based devices and may include general-purpose processors or specially-adapted processors (e.g., an Application Specific Integrated Circuit). Such processor-based devices may include or otherwise access the non-transient, tangible, machine readable media to read and execute the code. By executing the code, the one or more processors perform the actions of the processes of methods 600, 650 and/or 1700.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method comprising:
retrieving a current price list of a plurality of cloud computing costs of a cloud computing provider and a usage report of cloud services;
generating usage information based on the usage report as a graph of past usage, wherein
the graph of past usage is configured to accept user input of a function based on expected future use to make an updated graph;
predicting future usage based on the usage report and the updated graph; and
recommending a number of reservations of cloud instances based on the predicted future usage and the retrieved current price list, including minimizing a cost function that takes into account the number of reservations of cloud instances, a price of a non-reserved cloud instance, and a variance in machine hour usage.

2. The method of claim 1, further comprising sorting the usage report into device family type and size.

3. The method of claim 1, further comprising identifying step jumps in usage of the cloud services from the usage report.

4. The method of claim 3, further comprising identifying a variance and mean of each of one or more identified step jumps in usage of the cloud services.

5. The method of claim 1, further comprising displaying a list of a variance and mean of each of one or more identified step jumps in usage of the cloud services in a GUI.

6. The method of claim 1, further comprising displaying on a GUI a second graph illustrating a predicted future cost and the number of reservations of cloud instances reserved units.

7. The method of claim 1, wherein predicting future usage includes using the function comprises one or more of a step function, a linear function, a quadratic function, a logarithmic function, and an exponential function.

8. The method of claim 1, further comprising receiving user input of the function.

9. The method of claim 1, further comprising reserving the number of reservations with the cloud computing provider.

10. The method of claim 1, wherein determining the number of reservations is based on a difference in price between a reserved instance of a virtual machine and the non-reserved instance of the virtual machine in the current price list.

11. The method of claim 1, wherein the expected future use comprises a surge in needed virtual machine capacity or a length of a planned shutdown of a product.

12. The method of claim 1, further comprising displaying the number of reservations and a predicted savings amount when the number of reservations are reserved.

13. A computing device comprising:
a memory containing machine readable medium comprising machine executable code having stored thereon instructions for performing a method of using cloud computing;
a processor coupled to the memory, the processor configured to execute the machine executable code to cause the processor to:
retrieve a current price list of a plurality of cloud computing costs of a cloud computing provider and a usage report of cloud services;
generate usage information based on the usage report as a graph of past usage, wherein
the graph of past usage is configured to accept user input of a function based on expected future use;
receive user input of the function;
update the graph of past usage with the received user input of the function to make an updated graph;
predict future usage based on the usage report and the updated graph; and
determine a number of reservations based on the predicted future usage and the retrieved current price list, including minimizing a cost function that takes into account the number of reservations, a price of a non-reserved cloud service, and a variance in machine hour usage.

14. The computing device of claim 13, wherein the machine executable code is further configured to cause the processor to display the number of reservations and a predicted total savings based on the number of reservations.

15. The computing device of claim 13, wherein the machine executable code is further configured to cause the processor to calculate and display a listing of additional virtual machine instances to reserve based on the predicted future usage and the retrieved current price list.

16. The computing device of claim 13, wherein the cloud service comprises a plurality of cloud instances determining the number of reservations is calculated based on a minimization function.

17. A non-transitory machine readable medium having stored thereon instructions for performing a method comprising machine executable code which when executed by at least one machine, causes the machine to:
- retrieve a current price list of a plurality of cloud computing costs of a first cloud computing provider and a usage report of cloud services;
- generate usage information based on the usage report as a graph of past usage, wherein
- the graph of past usage is configured to accept user input of a first function based on expected future use;
- receive user input of the first function;
- update the graph of past usage with the received user input of the first function to make an updated graph;
- predict future usage based on the usage report and the updated graph; and
- determine a number of reservations based on the predicted future usage and the retrieved current price list, including minimizing a cost function that takes into account the number of reservations, a price of a non-reserved cloud service, and a variance in machine hour usage.

18. The non-transitory machine readable medium of claim 17, wherein the machine executable code when executed by the at least one machine further causes the machine to determine a second number of reservations for a second cloud computing provider based on a second current price list of a second plurality of cloud computing costs of the second cloud computing provider.

19. The non-transitory machine readable medium of claim 17, wherein the number of reservations comprises a plurality of numbers of reservations for a plurality of different device types, wherein the different device types are based on one or more of: an operating system, a dedicated use or a shared use, a processor type, an amount of memory, and a location.

20. The non-transitory machine readable medium of claim 17, wherein the machine executable code when executed by the at least one machine further causes the machine to display on a GUI a dashboard interface comprising: a total annual amount spent on cloud computing expenses from the first cloud computing provider and a second cloud computing provider.

* * * * *